United States Patent [19]

Barber et al.

[11] 4,183,779

[45] Jan. 15, 1980

[54] AUTOMATIC INDICIA APPLYING MACHINE

[75] Inventors: Donald T. Barber, Toronto, Canada; Dale L. Anderson, Mound, Minn.

[73] Assignee: Datafile Limited, Willowdale, Canada

[21] Appl. No.: 830,118

[22] Filed: Sep. 2, 1977

[51] Int. Cl.² .............................................. B32B 31/00
[52] U.S. Cl. ................................. 156/361; 156/364; 156/384; 156/542
[58] Field of Search .............................. 156/361–364, 156/378, 384, 540–542, 552; 235/486–487, 432

[56] References Cited

U.S. PATENT DOCUMENTS

| | | | |
|---|---|---|---|
| 3,711,683 | 1/1973 | Hamisch | 235/487 |
| 3,721,601 | 3/1973 | Pituch et al. | 186/361 X |
| 3,997,304 | 12/1976 | Kuring | 156/362 X |
| 4,035,808 | 7/1977 | Karp | 156/384 X |
| 4,082,595 | 4/1978 | Slater | 156/361 X |

*Primary Examiner*—David A. Simmons

[57] ABSTRACT

Apparatus for applying at predetermined positions within a predetermined location on a carrier surface predetermined discrete pieces of indicia which in combination provide a predetermined indicia presentation particular to the carrier surface location as part of a scheme of marking like surface locations with indicia presentations which may vary from location to location; the apparatus comprising a plurality of indicia applying sources consisting of a source for each discrete piece of indicia to be called for by the scheme, means for feeding the carrier surface past each of the indicia applying sources so that each predetermined point within the predetermined location is presented for the application thereto of indicia from each source, and a control unit for controlling the indicia applying sources in response to input thereto of input control data for the predetermined surface location defining the discrete pieces of indicia and position thereof required therefor, the control unit operating to activate any of the sources which applies any discrete piece of indicia called for by the input control data respective such location to effect application of such indicia at any and all positions called for by such input control data. The apparatus is especially adapted for applying color coded labels and the indicia applying sources are labelling devices for applying such labels.

63 Claims, 30 Drawing Figures

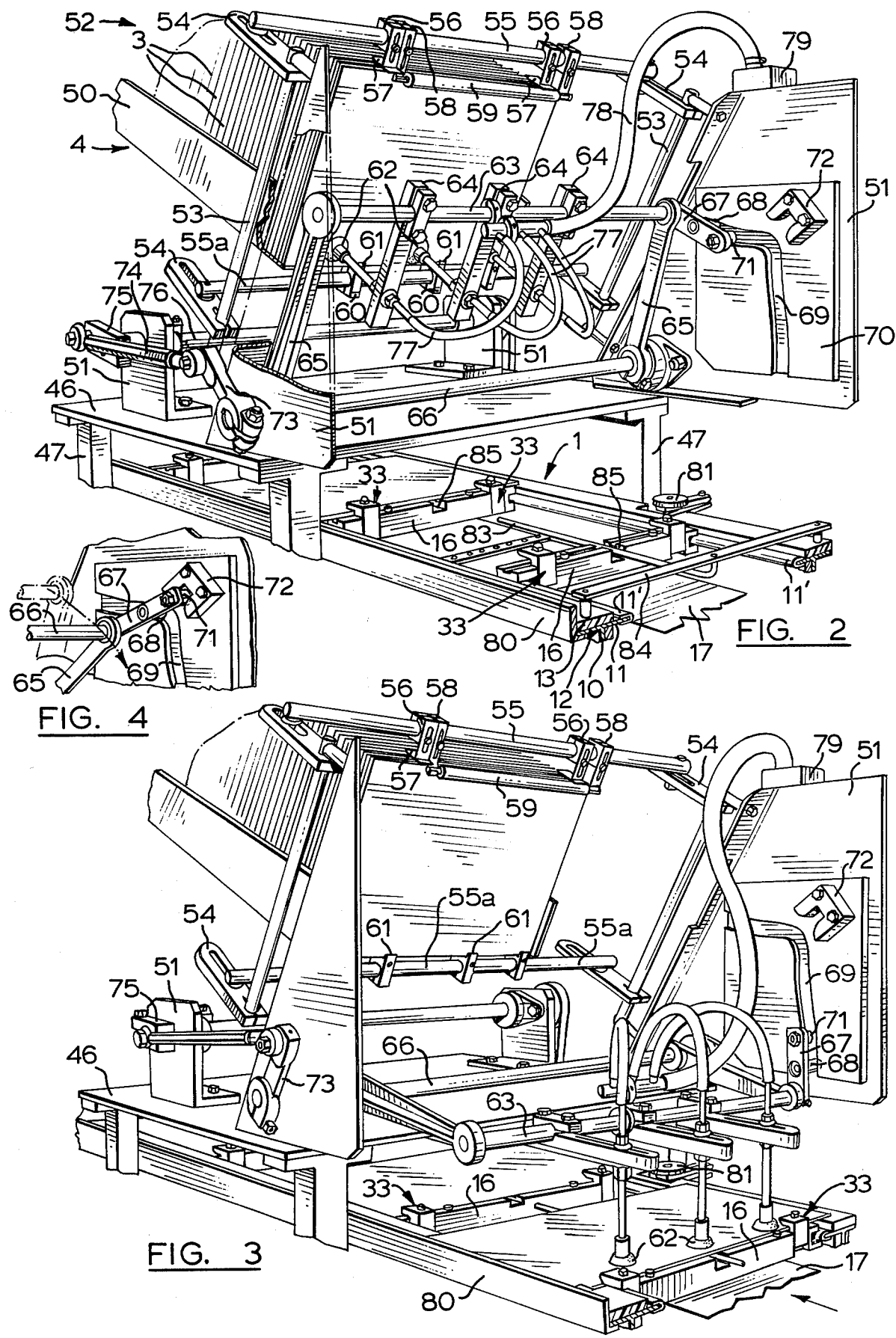

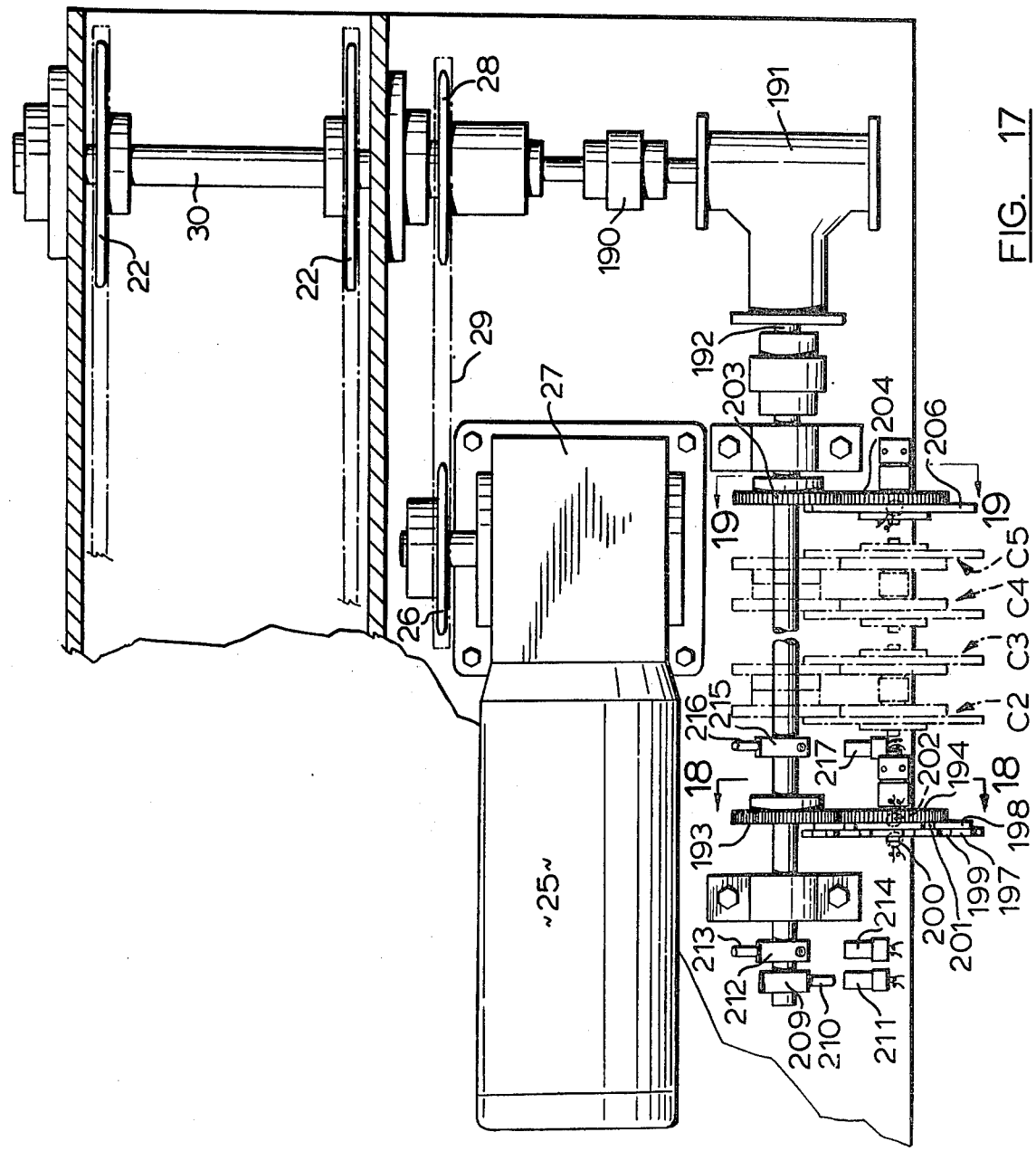

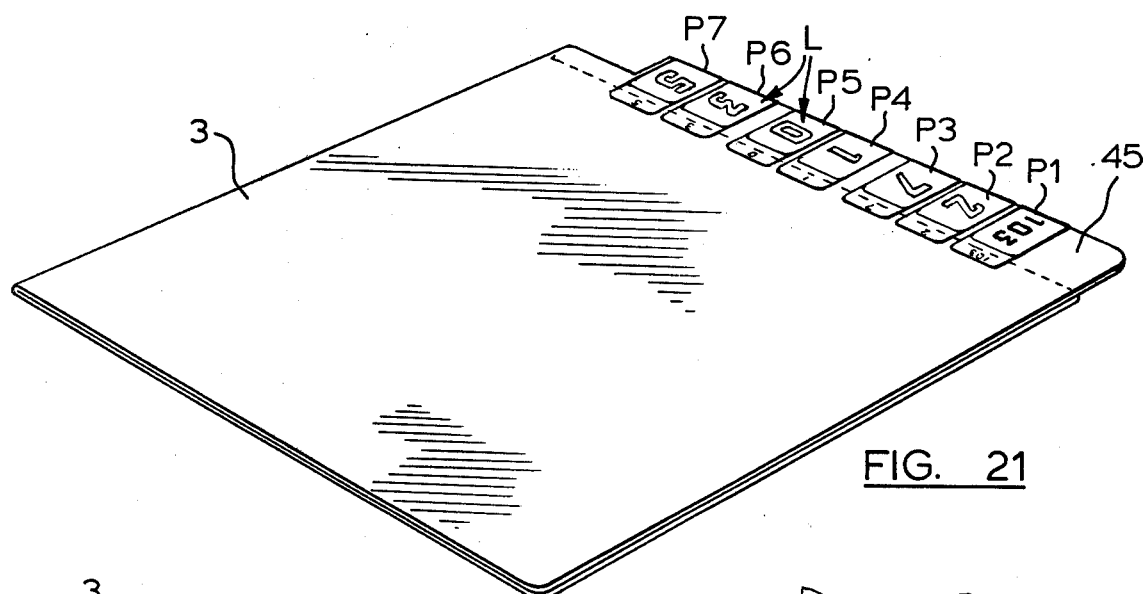
FIG. 21
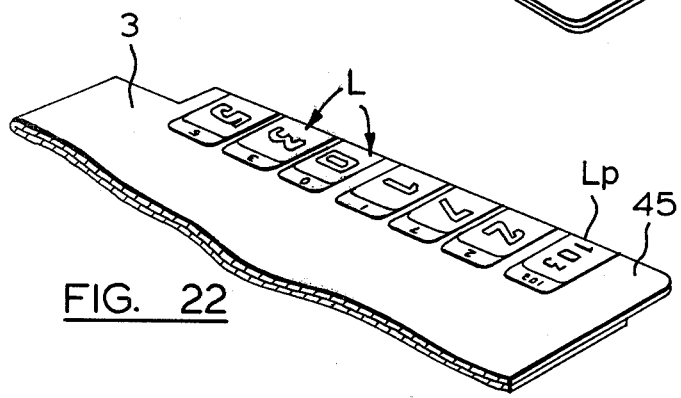
FIG. 22
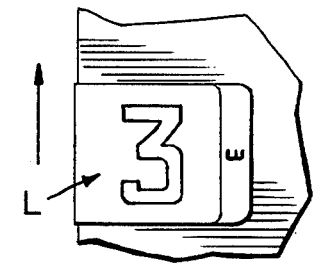
FIG. 24
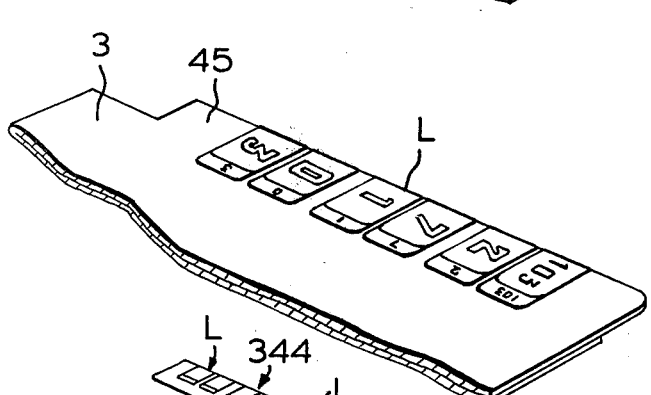
FIG. 23
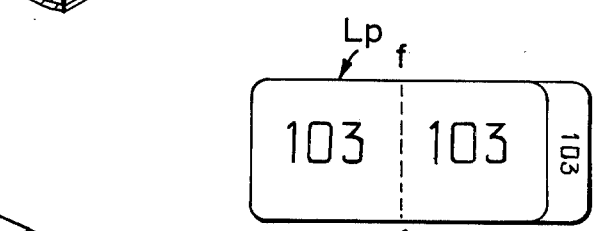
FIG. 25
FIG. 26
FIG. 27
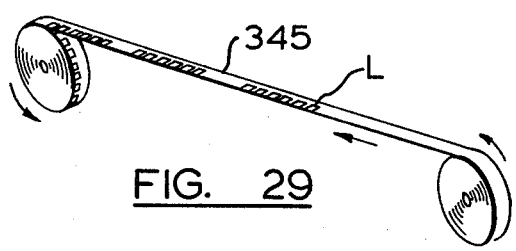
FIG. 28
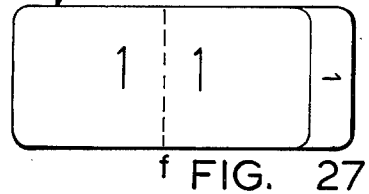
FIG. 29

AUTOMATIC INDICIA APPLYING MACHINE

This invention relates to an apparatus for applying to a surface indicia or markings which cannot be applied by conventional printing equipment. The invention has particular application for the applying of coloured, i.e. colour coded indicia to a carrier surface on which it is desired that a colour coded indicia or information display be presented. Such display may comprise, for example, a colour coded number or a number in which some of the digits are colour coded, or colour coded identifying lettering. Such displays are desirable, for example, on a file folder, index card or the like or on a surface which is to become or to be attached to a file folder, index card or the like. More particularly the invention relates to a novel apparatus which transports the file folder, index card, file folder attachment strip or the like, which constitutes the carrier on the surface of which it is desired to apply a colour coded indicia display, the apparatus automatically selecting and applying to such transported carrier surface a predetermined combination of colour coded indicia arranged in a predetermined order in accordance with input instructions fed to the apparatus, the combination and order of such colour coded indicia constituting the desired colour coded information to be displayed on such surface. It will be understood that such display may be applied with or without other information which may be applied in non colour coded form.

BACKGROUND OF THE INVENTION

There are many applications where it is desirable to apply to a surface colour coded markings or indicia, that is, markings or indicia having an identifying colour particular thereto associated therewith. For example, it is frequently desirable to apply colour coded digits or letters to a carrier surface so that their combination and arrangement provides a colour coded information display which gives a high visual impact. One notable application is the applying of colour coded indicia, e.g. colour coded numbers or letters, to a file folder or the like, or a strip to be applied to a file folder or the like for purposes of providing a colour coded filing system. Such a colour coded filing system is highly advantageous where a large number of files are involved such as occurs in government departments, insurance and other large companies, hospitals and other institutions.

In such a large filing system, very frequently the file identification is constituted by a number assigned to that file. That is, the file has a reference number, and a typical reference or file identification number for the casualty insurance business might be the policy number 7367060. To provide for colour coding, ten mutually distinctive colours for the ten digits "0" through "9" inclusive are selected and each of these colours is assigned to a specific one of the ten digits. Thus, for example, the colour pink may be assigned to the digit "0," the colour red to the digit "1," the colour orange to the digit "2," etc.

It is a matter of choice as to how many of the digits making up the file reference number should be colour coded. It will be appreciated that the greater the number of digits that are colour coded, the greater will be the visual distinctiveness of the file to preclude misfiling. In other words, when the file reference numbers are colour identified in this way, misfiles are easily located because a misfile breaks the otherwise consistent pattern of colour inherent in a number series. Reference to a specific file is fast and direct because the colour blocks are arranged at the extreme edge of the folder and can be distinguished without "fanning". The ten colours that identify the ten digits are soon memorized and "read" as the numbers they represent.

In the above example, 7367060, typically the last five digits 67060 would be colour coded and the first two digits, i.e. the prefix 73, would be printed in black without colour.

In the case of a nine digit number, such as a Social Security number, incorporated into a Social Security filing system, the number might be say 127367060. Here it is desirable to colour code the last six digits, 367060 and to print the first three in black only. There could also be different arrangements of sub groups such as:

127 - 36 - 70 - 60 or

127 - 367 - 060 where the 3, 6, 7, 0, 6 and 0 are colour coded and the 127 is printed black.

Various production methods have been proposed and used to colour identify the reference indicia. One method is to manufacture ten individual self adhesive labels each in its distinctive colour. The labels are then manually affixed to folders according to the required number sequence. This method, although extremely cumbersome, does give the required flexibility in the colour identification of random or discontinuous reference numbers. Another method is to print the colour blocks directly on the folders. Usually when this is done only the last two, or terminal digits, are identified by colour blocks and the method has little applicability. Still another method is to first print the numbers in their distinctive colours on paper strips by running the strips through a series of printing steps. The strips are afterwards glued around the edge of the folders. For discontinuous reference numbers the printing of the colours is sometimes done on punched cards in a series of sorting and printing operations, as disclosed in U.S. Pat. No. 3,504,907. A typical example of a filing system with a discontinuous number series is the "in force" policy file of a casualty insurance company.

In any large filing set up or changeover project when it is desired to colour identify the reference indicia as above described it usually takes many weeks to prepare the colour coded folders. Or alternately, the changeover process goes on for many weeks or months.

The present invention provides an apparatus which overcomes the difficulties and tediousness presently encountered in such tasks as the preparation of colour coded files or the like and enables the colour coding to be carried out extremely rapidly and automatically at great savings of time and money.

SUMMARY OF THE INVENTION

According to the invention, apparatus for applying indicia, at least some of which is colour coded, to a carrier whose surface is to receive a desired predetermined colour coded indicia display according to a predetermined scheme comprises: a plurality of colour coded indicia sources each adapted to apply specific colour coded indicia with the indicia source for each different piece of colour coded indicia to be called for according to the predetermined scheme; a transport system for presenting the carrier to each of said indicia applying sources in turn so that the entire surface area which is to receive indicia is progressively exposed to each of said sources for the application thereby on actuation thereof of indicia at any position or positions within the area, and a control unit responsive to input control data designating the desired indicia display for such carrier surface controlling the indicia applying sources to actuate a selected one or ones of such sources as called for by the input control data to cause same to apply indicia to the carrier surface at the appropriate position or positions within the carrier surface area.

In the specific embodiment of the invention, hereinafter particularly described, the sources of colour coded indicia comprise label applying devices with each labeller being adapted to dispense and apply a particular colour coded label. For applying colour coded digits, as particularly described, ten labellers are employed, one for each of the ten digits "0" to "9" inclusive so that a surface can be labelled with any colour digit arrangement selected from one or more of the ten digit sources.

Usually when applying a colour coded display, the colour coded indicia will only constitute a part of the total indicia display to be presented on the carrier surface. It will be understood that in such a case the apparatus may also include at least one source of non colour coded indicia as well as the colour coded indicia sources and the transport system will also present the carrier to such non colour coded indicia source for application of such non colour coded indicia thereto, under control of said control unit, as called for by the input data.

In this connection the source of non colour coded indicia comprises a printer and the invention provides for the printer when utilized to be under control of the control circuit to print the non colour coded number or digits or letters of the alphabet as required in one of a number of selected formats depending upon the number of digits or letters to be printed. Conveniently the printer may be arranged to print labels and such labels may be applied by a further label applying device or print labeller under control of the control circuit.

The invention, in providing for individual sources for the different specific pieces of indicia which may be called for, lends itself to the application by each source of additional but corresponding machine readable indicia such as Optical Character Recognition (OCR) indicia, UPC bar codes, or MICR magnetic ink which can be "machine read" by the appropriate OCR or other reading wand or scanner. Thus the invention enables the application of an indicia display which can be "machine read" or inspected to determine that the actual indicia display that has been applied is in accordance with the input data. In addition to thus enabling the apparatus to be "self inspecting", the presence of such machine readable indicia provides, for example, a means of giving file control in a filing system in which files bearing indicia applied by the apparatus are to be incorporated where the disposition of such files can be recorded in a computer memory when read by the appropriate wand or scanner which comprises an input device to the computer memory, as more fully explained in co-pending application Ser. No. 775,667.

The invention will be understood from the following detailed description of a preferred embodiment of the invention read in conjunction with the accompanying drawings.

DETAILED DESCRIPTION OF THE DRAWINGS

FIG. 1 is a front elevational view, partly broken away, of an indicia applying machine embodying the invention and specifically adapted for applying labels to file folders and the like.

FIGS. 2 and 3 are perspective views of the file folder feed mechanism of the machine for delivering file folders to the transport mechanism and showing the mechanism in folder pick up and folder placing positions respectively.

FIG. 4 is an enlarged perspective view of a section of the cam and cam follower arrangement for controlling the movement of the file folder feed mechanism.

FIG. 17 is a part horizontal sectional, part plan view showing the machine drive and timing mechanism.

FIG. 21 is a perspective view of a file folder to which the machine has applied one arrangement of labels.

FIGS. 22 and 23 show other label formats which the machine may typically apply.

FIG. 24 is an enlarged plan of one of the labels showing the digit 3 carrying the OCR 3 designation at one edge.

FIG. 25 shows a label produced by the printer with a three digit format.

FIG. 26 shows a printed label with a two digit format.

FIG. 27 shows a printed label with a one digit format.

FIG. 28 is a perspective view of an individual strip for attachment to a file folder.

FIG. 29 is a diagrammatic view of a continuous web of material which may be fed beneath the labellers and labelled as a continuous strip for subsequent severing into individual strips for applying to a file folder or the like.

DETAILED DESCRIPTION OF THE INVENTION

With reference to the drawings, the specific embodiment of the indicia applying apparatus embodying the invention illustrated constitutes an automatic labelling machine specifically adapted for applying labels to file folders or the like. The labels applied by the machine illustrated herein provide for labelling a file folder or the like with a label arrangement which has wide application, namely a top or first position label printed in black, and subsequent labels in the subsequent positions being colour coded digits. It will be understood, however, that the invention is not intended to be limited to the specific arrangements and details illustrated herein and hereinafter more particularly described as it will be apparent to those skilled in the art that a machine operating on the principle of operation of the specifically disclosed machine may employ substitute mechanism and take different specific forms.

Figure 1:
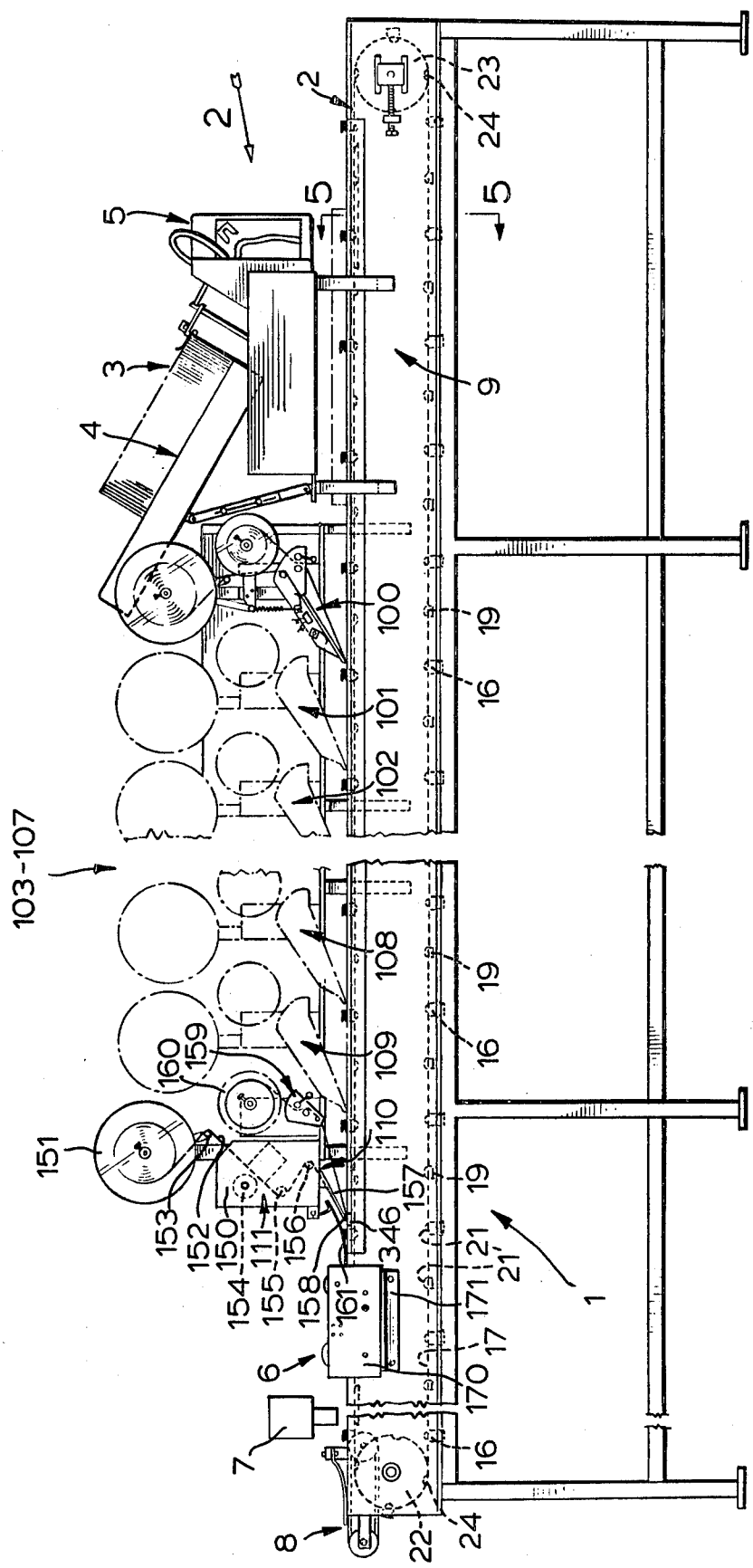
Figure 20:
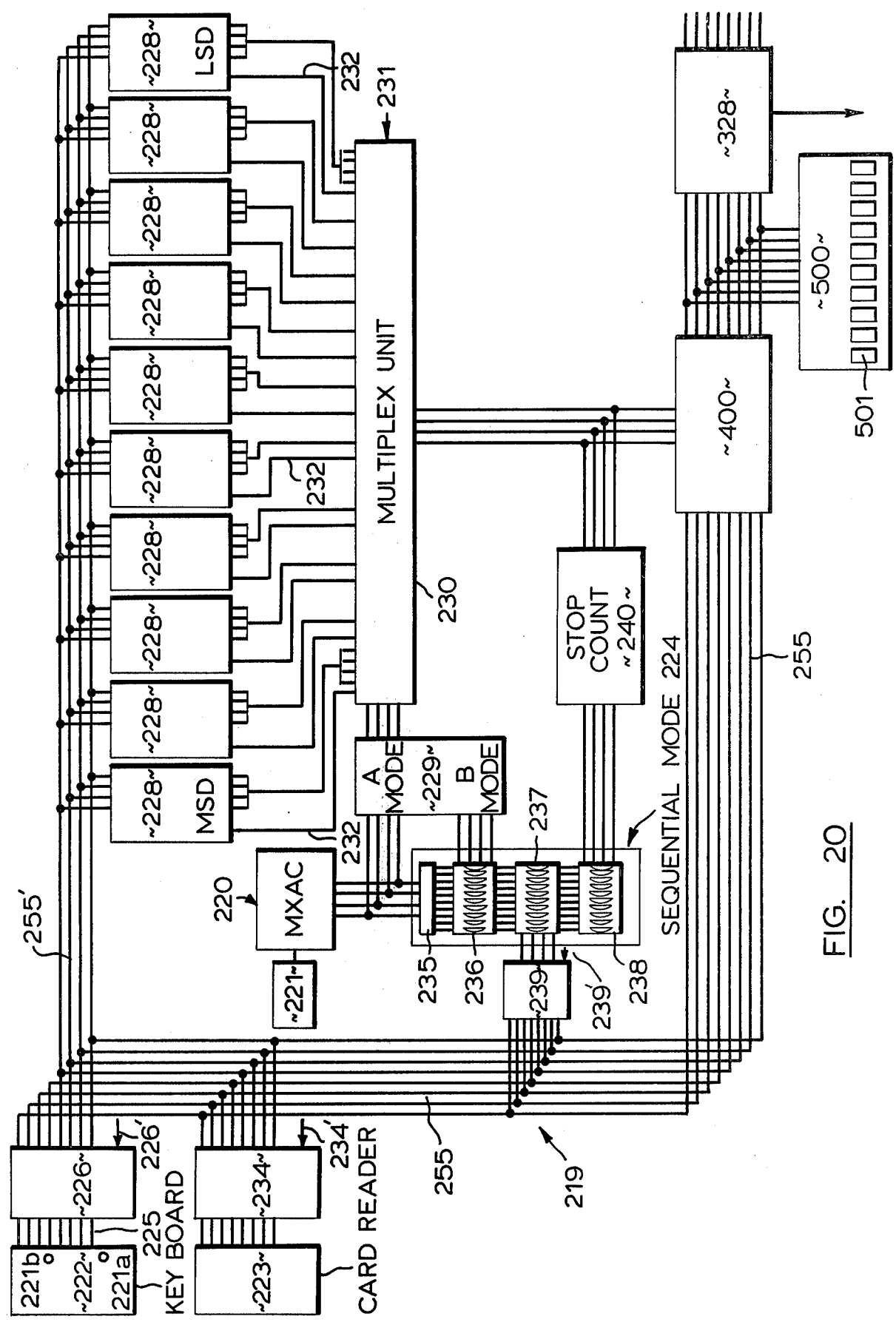
FIGS. 20, 20A and 20B are schematic diagrams which together illustrate the control system of the machine.
Figure 20A:
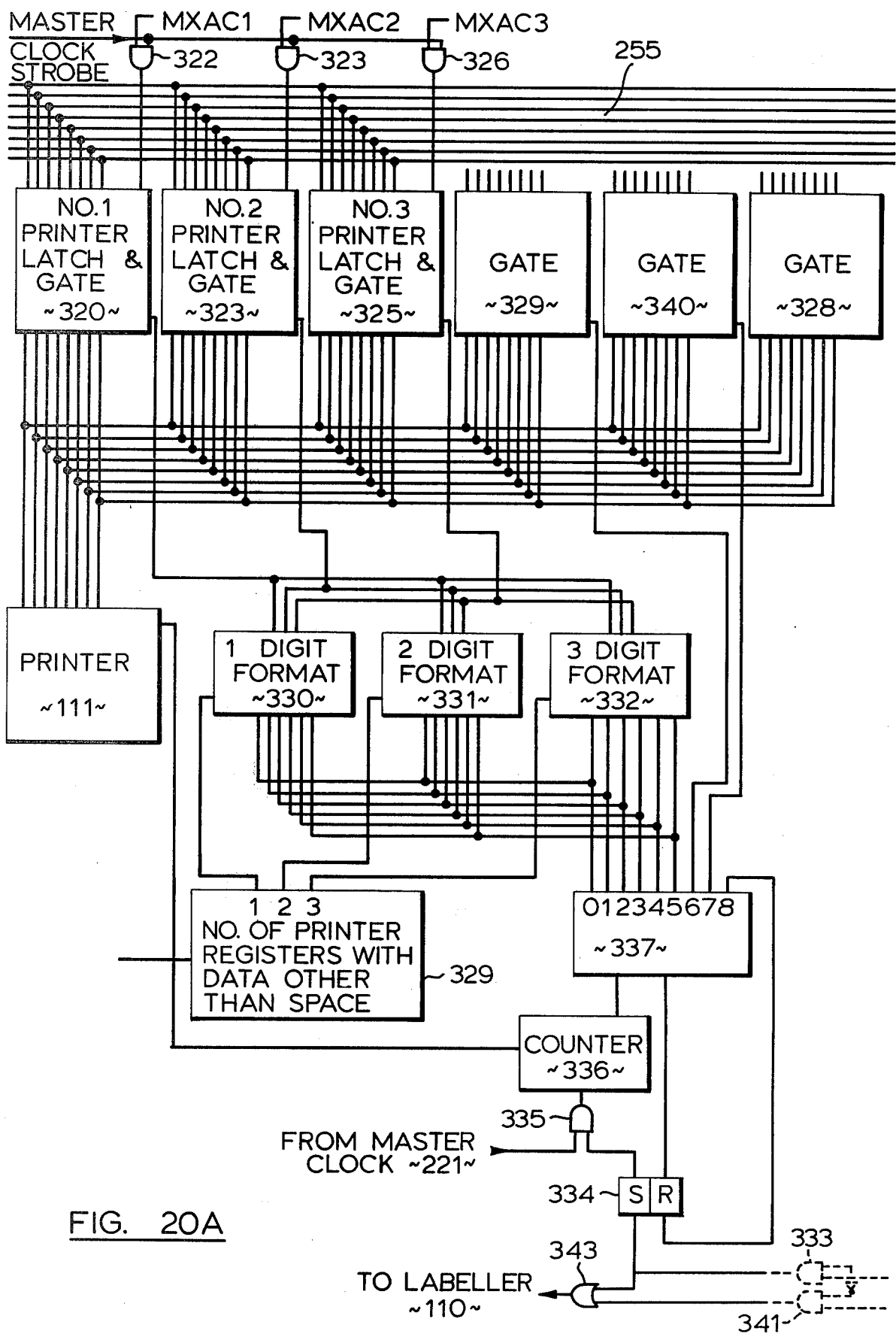
Figure 20B:
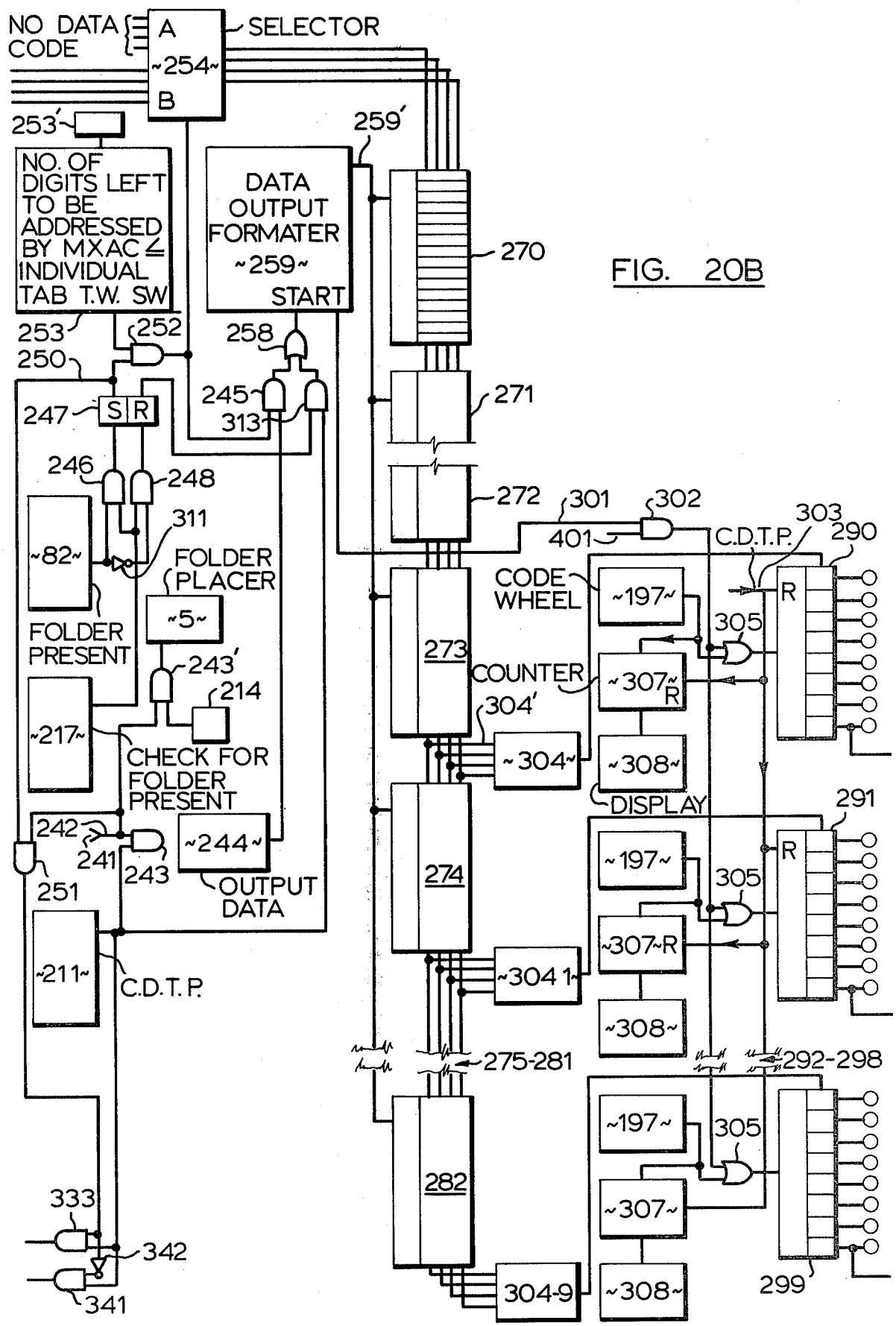

FIG. 1 is a side elevational view of the arrangement of the physical means for applying the desired indicia to a file folder while FIGS. 20, 20A and 20B schematically disclose the control circuit. With reference to FIG. 1, the machine will be seen to include a longitudinal support table or frame generally designated at 1 which supports a transport mechanism or conveyor generally designated at 2, for delivering file folders or the like 3 from a magazine 4, the folders being fed from the magazine to the transport mechanism by means of a folder feed mechanism generally designated at 5.

The transport mechanism 2 is adapted to feed folders past a series of ten labellers, 100 to 109 inclusive, with the labeller 100 dispensing and applying labels with the colour coded digit "0" thereon, labeller 101 dispensing and applying labels with the colour coded digit "1" thereon, etc. with the labeller 109 dispensing and applying labels with the colour coded digit "9" thereon. Beyond the final digit labeller 109 is a labeller generally designated at 110 incorporating a label printer 111. Beyond the combination labeller-printer 110-111 is a label fold-over device generally designated at 6, followed by a machine reader or wand 7 for inspecting the applied labels and a discharge device generally designated at 8.

Transport Mechanism

Figure 5:
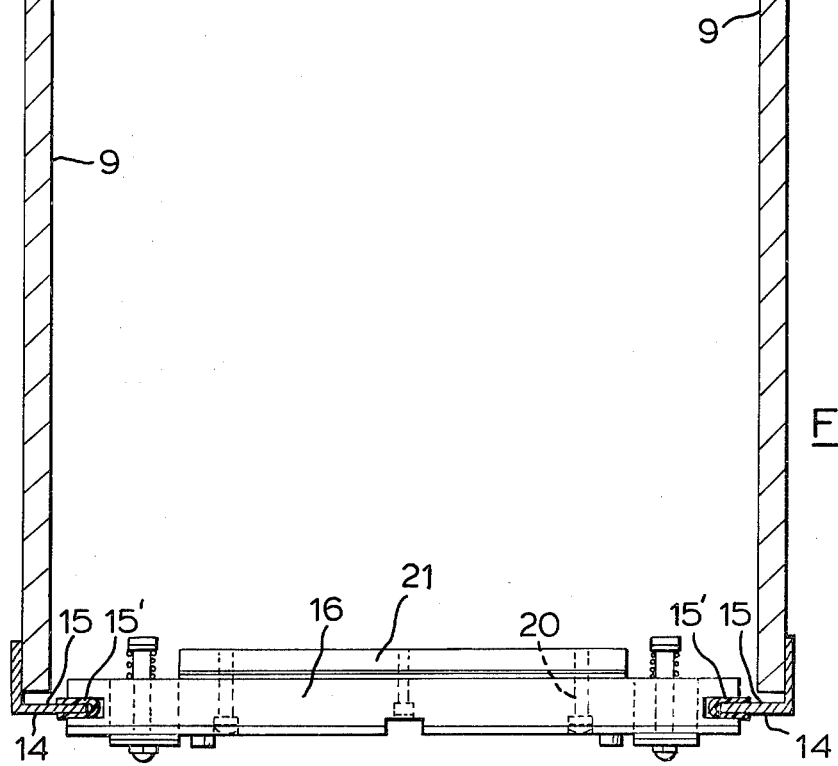
FIG. 5 is a vertical sectional view taken on the line 5—5 of FIG. 1.

As illustrated in FIG. 5, the table frame 1 supports a pair of longitudinal spaced apart vertical side plates 9 which run longitudinally of the frame and supported on the upper edges of these plates 9 are t-bars 10 with one of the legs 11 of the bars projecting inwardly to form a support track carrying a low friction cap 11' of any suitable smooth material while the other leg 12 projects outwardly to support a horizontal folder edge support runner strip 13 of any suitable smooth low friction material.

Secured at the lower edges of the plates 9 are L-shaped members 14, the legs 15 of which project inwardly to form the lower guide tracks which carry low friction caps 15' corresponding to the caps 11'.

Figure 6:
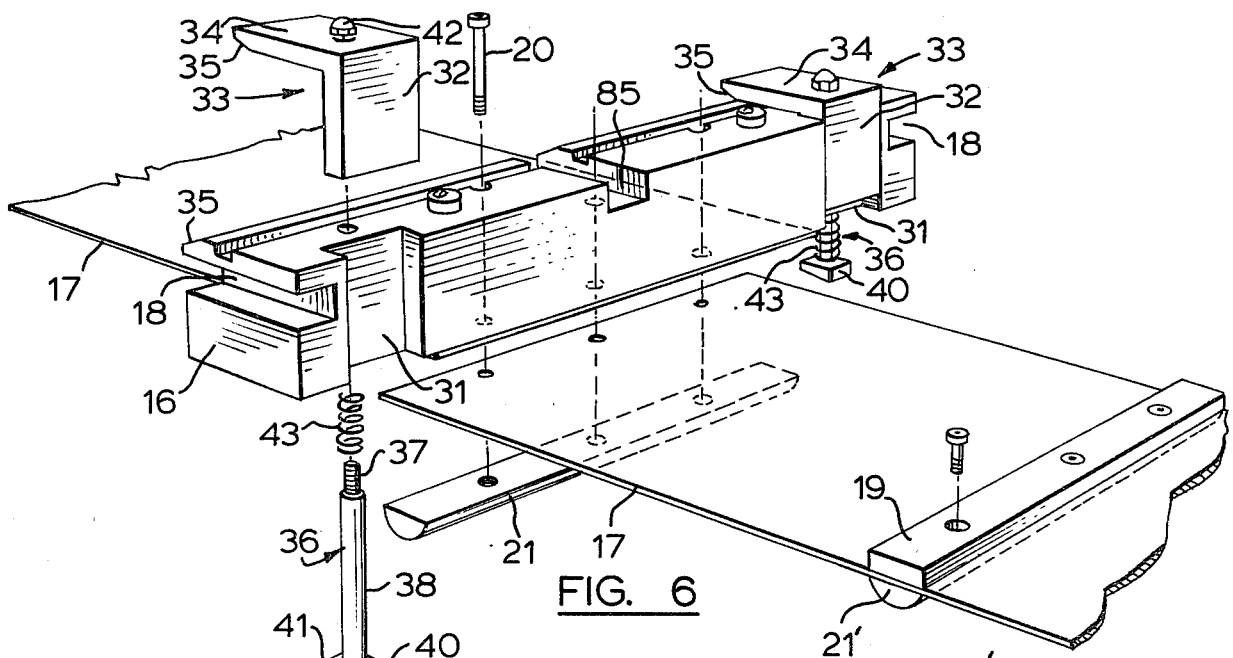
FIG. 6 is an exploded perspective view of a portion of the file folder conveyor mechanism.
Figure 7:
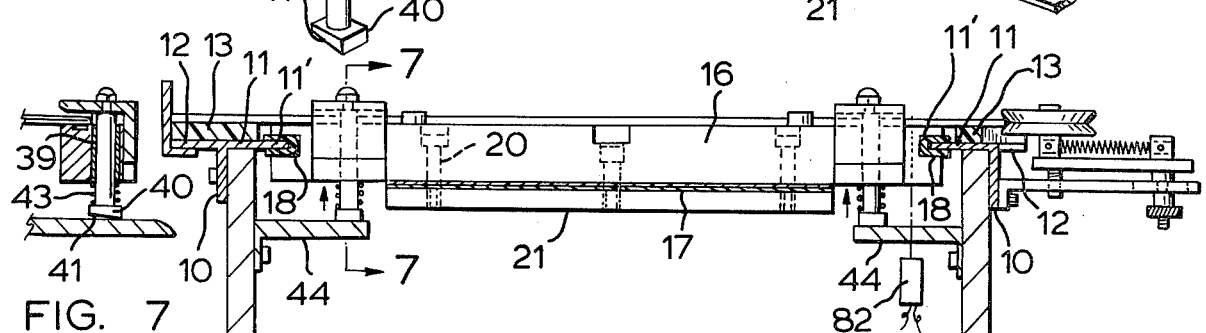
FIG. 7 is a vertical sectional view on the line 7—7 of FIG. 5.

As shown in FIGS. 5, 6 and 7, the conveyor is formed of a plurality of cross bars 16 connected together into an endless form by a plurality of spring steel sheet plates 17. Each of the cross bars 16 has a slot 18 in each end to receive the capped tracks 11 and 15 when travelling along the upper and lower reaches of the conveyor respectively. The plates 17 are connected to the cross bars 16 with their ends overlapped by means of bolts 20 which also secure semi-circular bars 21 to the undersides of the bars 16 when viewed in the top reach of the conveyor. Intermediate the cross bars 16, adjoining plates 17 are connected in overlapped position by upper clamp cross bars 19 and lower semicircular bars 21' corresponding to the bars 21.

The endless conveyor formed by the cross bars 16 and 19, plates 17 and bars 21 and 21' run over end wheels 22 and 23, at the left and right ends of the machine, as viewed in FIG. 1. These wheels 22 and 23 have an arrangement of semi-circular notches 24 therein to mesh with the semi-circular bars 21 and 21' to provide the desired positive conveyor feed. The spring steel plates 17 have sufficient flexibility to readily flex around the curvature of the wheels 22 and 23 to enable smooth conveyor drive. At the same time, these plates maintain a precisely accurate relationship between the bars 16 of the conveyor.

As illustrated in FIG. 17, the drive to the conveyor is accomplished through a drive motor 25 driving sprocket wheel 26 through a gear reducer 27. Sprocket wheel 26 drives a further sprocket wheel 28 through a chain drive 29, the sprocket wheel 28 being secured to a shaft 30 which carries the wheels 22 at the left hand end of the machine as seen in FIG. 1, the wheels being fixed to the shaft to drive the conveyor through the engagement of the wheel notches 24 engaging the semi-circular bars 21, 21'.

As seen in FIGS. 5, 6 and 7, the back side of each bar 16 with respect to the direction of conveyor travel is provided with a squared vertical slot 31 adjacent each end thereof.

Riding in each of these vertical slots 31 is the vertical leg 32 of a clamp member 33 having horizontal leg 34 which projects across the top of the bar with the bar in the upper reach of its travel to the leading edge of the bar. At this leading edge, the clamp leg 34 and bar edge are tapered as at 35 in the opposite direction to provide a guide mouth to receive the bottom edge of a file folder therebetween. A plunger member 36 associated with each clamp 33 controls the movement of the clamp in association with the guided vertical leg thereof. This plunger member 36 has a reduced threaded neck portion 37 extending through an opening in the horizontal clamp leg 34, an enlarged shank portion 38 extending through an oilite bearing 39 inserted in a suitable bore through the bar 16, and an enlarged foot portion 40 having a bevelled or cammed surface 41 at the underside thereof. The bar 16 is clamped against the enlarged shank portion 38 of the plunger by a nut 42 threaded on the neck portion 37. Engaging between the underside of the bar 16 and the foot portion 40 is a compression spring 43 which urges the plunger member 36 downwardly to draw the clamp down against the top of the bar to clamp the bottom edge of a file folder therebetween.

Cam bars 44 carried by the side plates 9 are provided immediately in advance of the point of delivery of the file folder by the folder feeder mechanism 5 to effect upward movement of the plungers as the conveyor advances to open the clamps to receive the file folders therebetween. After the plunger feet 40 ride off the cam bars 44, the clamps 33 will close under action of the spring 43 to firmly grip the bottom edges of the file folders at the widely spaced points towards the end of the folders to maintain same positively against movement during the indicia applying operations. In this connection it will be seen that the end edges of folders will extend outwardly over the folder edge runner strips 13 with the file folder edges substantially in registration with the outer edges of these strips.

While the relationship of the edge of the file folder and the inner runner strip 13 is not important, for the application of the indicia in the form of labels to file folders for which the machine operation is set up in the operation herein described, it is important that the outside edge of the file folder which, as seen in FIG. 21, comprises a tab receiving extending flap 45, be accurately in registration with the front runner strip 13 so that the labels L which are deposited on the flap 45 and which have pressure sensitive adhesive at their underside, will project clear of the runner strip and there will be no danger of their becoming adhered thereto. At the same time it is desired that the file folder flap or edge 45 be supported by the runner strip right out to its edge.

Very common file folders have dimensions of approximately 9½ inches in heighth and 11½ inches in width with about a one inch projecting tab having a length of eight inches. Conveniently, therefore, the bars 16 of the conveyor may be spaced every twelve inches to handle the typical file folder.

Magazine and folder feed mechanism

With reference to FIGS. 2 and 3, it will be seen that the magazine 4 which is mounted on a table 46 supported above the main table on frame 1 by brackets 47 comprises an inclined chute 50 in which the file folders 3 are stacked with their planes inclined at a small angle to the vertical. Mounted on the table 46 are flanged side plates 51 which in turn carry a frame generally designated at 52 comprising spaced uprights 53 inclined so that they are generally at right angles to the inclined chute, the uprights 53 carry slotted bracket bars 54 which adjustably support upper and lower cross bars 55 and 55a. The lower cross bar 55a adjustably supports the front end of the chute 50. The upper cross bar 55 has slidably mounted thereon one set of clamp blocks 56 which carry adjustable spring feet 57 to engage the upper edges of the file folders as they arrive at the discharge end of the chute 50 and another set of adjustable clamp blocks 58 which support a blocking roller 59, beneath which the upper edge of the file folder being retracted from the stack must be drawn and forming a bar to the movement of the upper edge of the next succeeding folder.

The lower cross bar 55a carries adjustable clamp blocks 60 which have projecting feet 61 projecting in front of the lower edge of the lowermost file folder in the stack, blocking its exit until positively withdrawn and providing a bar for the next succeeding file folder's lower edge.

The file folder pick-up device comprises a plurality of suction cups 62 adjustably mounted on a rock shaft 63 by means of clamp bars 64, the rock shaft 63 being journalled in the upper ends of rock arms 65 clamped to rock shaft 66.

Secured to one end of the rock shaft 63 is a crank arm 67 carrying a roller cam 68 which operates in a guide groove 69 of generally inverted L shape formed in a cam plate 70 carried by one of the side plates 51. A further cam or guide roller 71 at the end of the crank arm 67 is adapted to enter and ride in a downwardly facing channel cam block 72 to guide the end of the crank arm and effect the swinging thereof as the roller 68 moves from the upper reach of groove 69 into its downward reach to switch the suction cups 62 from their position in FIG. 2 to their position in FIG. 3.

Movement of the rock shaft 66 is accomplished by means of a crank arm 73 journalled on a connecting rod 74 which in turn is journalled on crank arm 75 secured to drive shaft 76 which is suitably driven (the drive not being shown) from the conveyor drive motor 25.

Vacuum is applied to the suction cups 62 through branch tubing 77 connected to the main vacuum source tubing 78 which is connected to a vacuum source (not shown) through a control valve 79.

The operation of the folder feeder mechanism is as follows: with the rock shaft 66 rocked forwardly as shown in FIG. 2 to bring the suction cups 62 into engagement with the file folder adjacent the bottom edge thereof and with the suction applied through the tubing 77 and 78 with the control valve 79 open and connecting the tubing to the source, the suction cups will grip the file folder and as the rock shaft 66 is rocked rearwardly, will draw the lower or bottom edge of the foremost file folder over the feet 61 and the trailing edge of the file folder will be drawn beneath the roller 59 as the rock shaft rotates carrying the support arms 65 rearwardly. It will be understood that the file folder will have adequate flexibility to permit the necessary deflection to pass the feet 61 and roller 59. As the rock arms 65 move rearwardly, the rock bar 63 will be actuated by the movement of the lever arm 67 as its cam roller 68 follows the cam groove 69 and the cam roller 71 engages the cam block 72, so that the suction cup 62 will be swung something over 90° to bring the file folder carried thereby into the horizontal position of FIG. 3 in position to have its bottom edge engaged by the clamps 33 of the conveyor mechanism or transport system.

At this point the suction will be released from the suction cups 62 and the suction cups will reverse their movement through reversal of the movement of the rock shaft 66 to return to the position of FIG. 2.

It will be appreciated that the clamp 33 will be opened by the cam bars 44 (FIG. 5) as they advance so that the bottom edge of the file folder is received between the top of the respective cross bar and the clamps 33 as these clamps engage and carry the file folder forwardly until their cam feet 40 ride off the cam bars 44 allowing the clamps to close and positively grip the file folders.

To ensure proper registration of the edge of the tab 45 of the file folder with the edge of the front runner strip 13, an edge guide rail 80 is provided along the front edge of strip 13 at the file folder placement location and the opposite edge of the file folder engages a spring loaded guide pulley 81 which pushes the edge of tab 45 against guide rail 80 before clamps 33 close.

Located beneath the upper reach and to one side of the conveyor at the point of folder deposit on the conveyor is a sensor 82 FIG. 5 which responds to reflected light from a deposited folder. This sensor signals the presence of a folder delivered by the folder feed mechanism. A guide rod 83 suspended from a cross bar 84 which is received in central notches 85 of the bars 16 holds the folders 3 down on the conveyor while being aligned by the guide pulley 81.

Labeller Mechanism

Figures 8, 9:
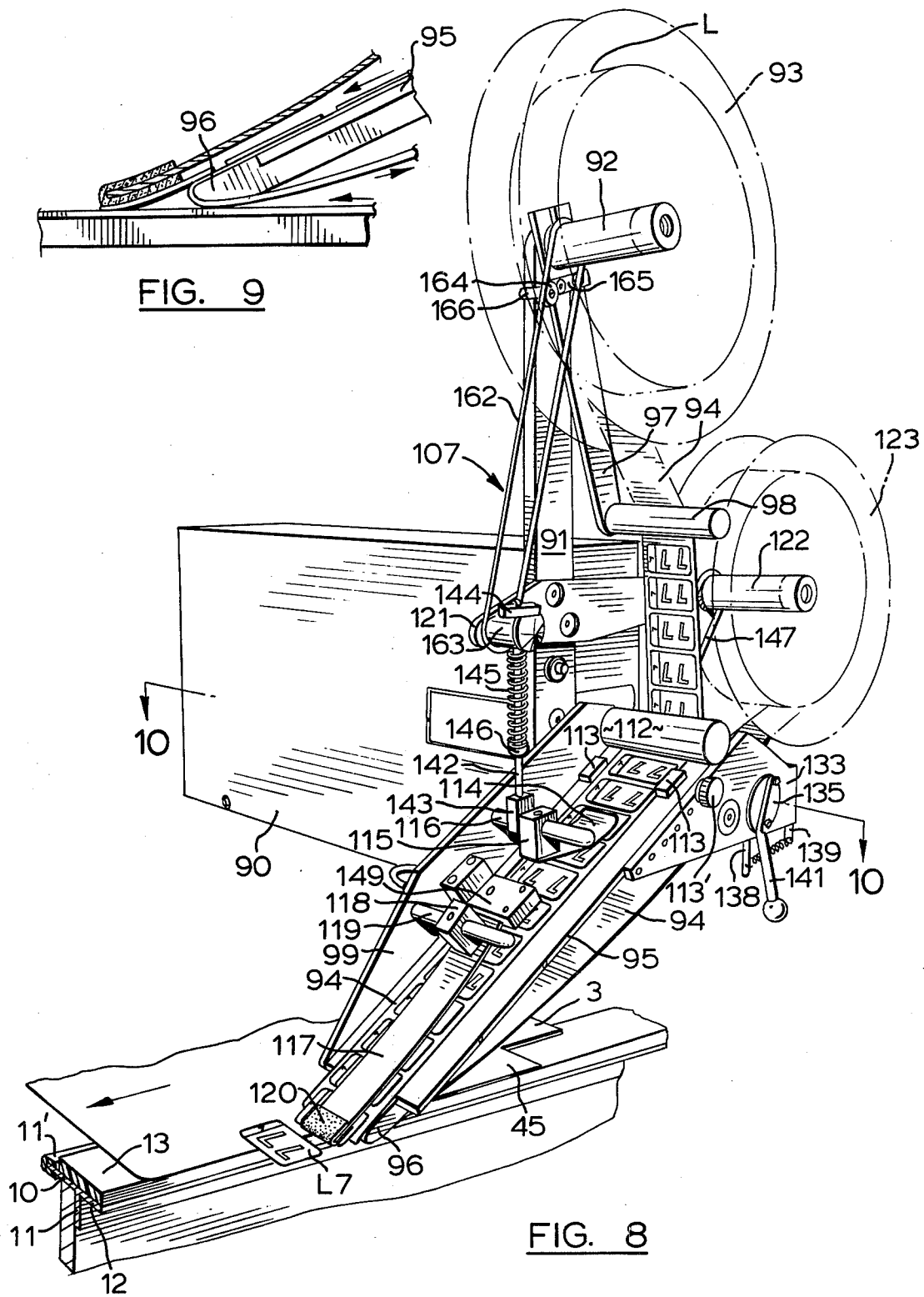
FIG. 8 is an enlarged perspective view of one of the labellers utilized in the machine.
FIG. 9 is an enlarged side elevational view of the delivery end of the labeller of FIG. 8.
Figure 10:
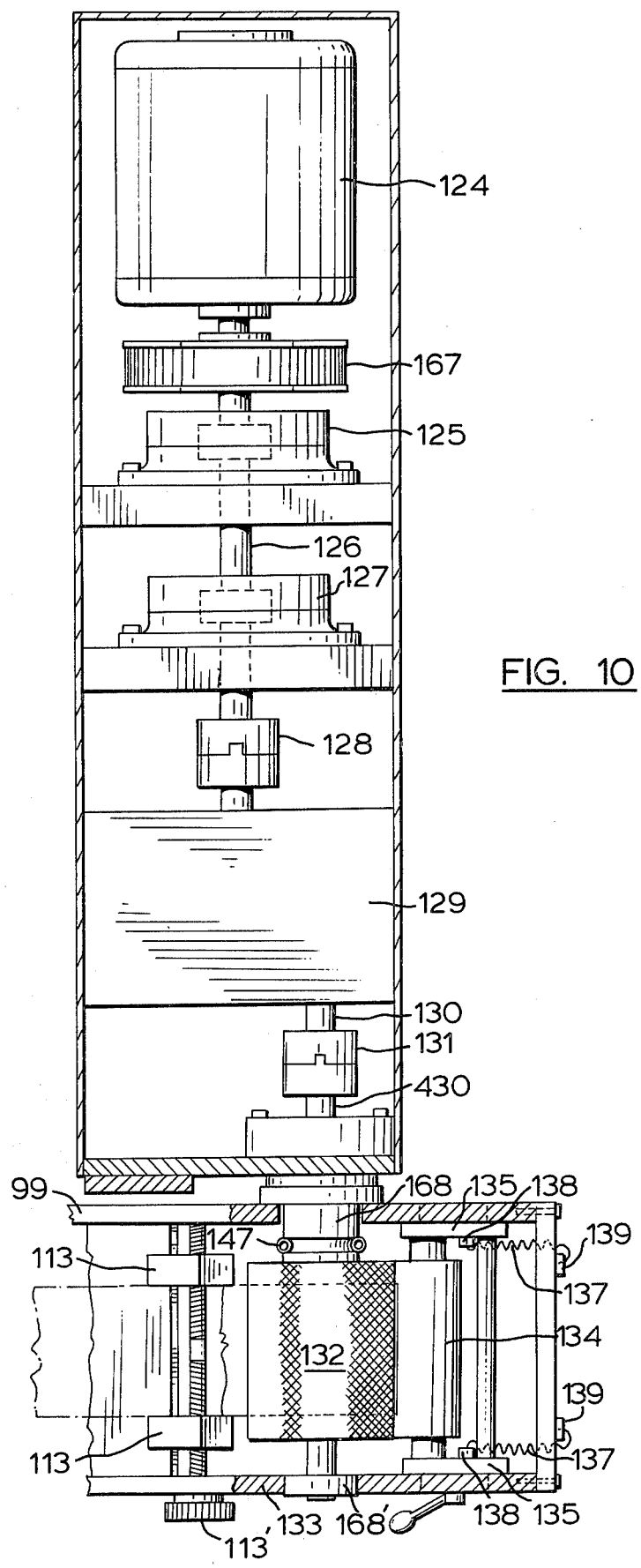
FIG. 10 is a horizontal sectional view on the line 10—10 of FIG. 8.
Figure 11:
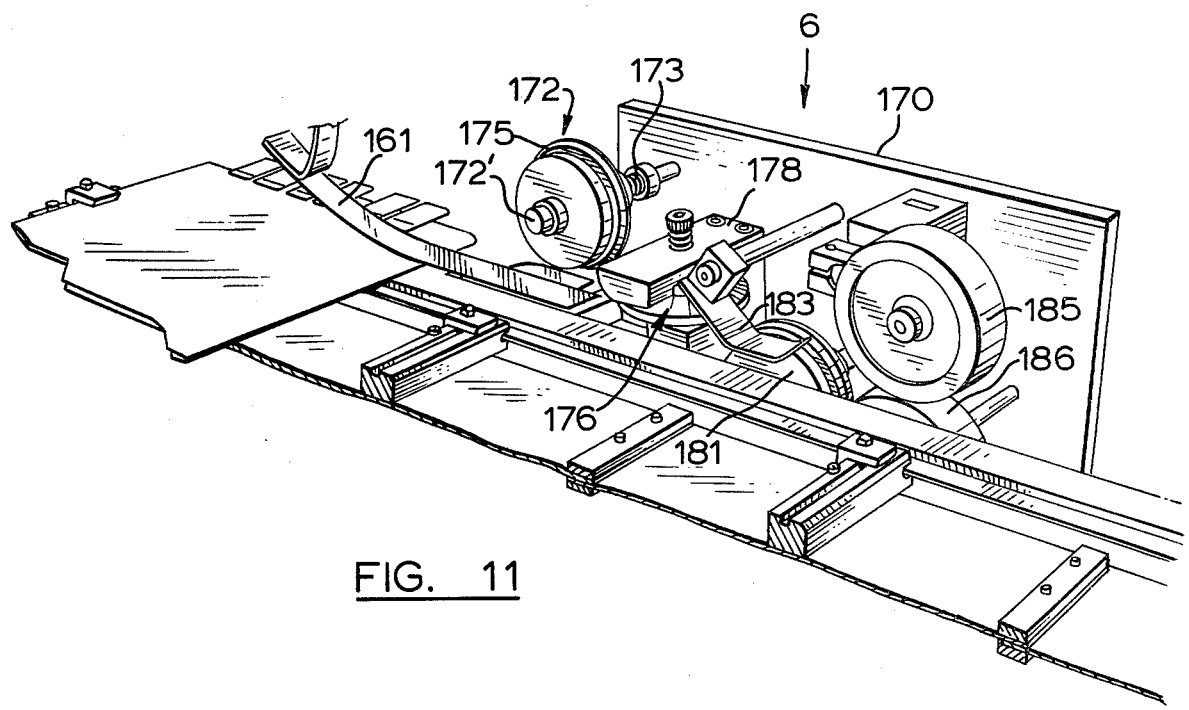
FIG. 11 is a perspective view of the label fold-over mechanism at the output end of the machine showing the file folder with the labels projecting to one side prior to fold-over.

Labellers 100 to 109 inclusive are commercially available labeller mechanisms and a typical labeller 107 is illustrated in FIGS. 8 to 10 for delivering the "7" digit label and applying it to the flap 45 of the file folder being fed therebeneath by the conveyor. As illustrated in FIG. 8, the labeller comprises a main housing 90 suitably supported to extend transversely across the support table or frame 1 above the conveyor and this housing carries an upright support arm 91 which has at its upper end a reel carrying stub shaft 92 which rotatably supports a reel 93 containing a stock of labels L. Since these particular labels are the "7" digit labels, they may be designated L7 and each comprises a label having a pressure sensitive adhesive attached to the underside thereof and having the numeral 7 appearing twice, one for each side of the file folder flap 45. In the colour code scheme chosen the digit "7" appears twice, as a white letter outlines in black on a purple coloured background field. To one side or at the end of the colour coded background field is an Optical Character Recognition (OCR) digit "7" printed in black on a non coloured background and arranged in right angular relation to the larger 7 digits appearing thereon. These labels are carried on a web strip 94 having a suitable release coating or surface from which they can be stripped prior to their application to the file folder flap 45.

Projecting downwardly and forwardly with respect to the movement of the conveyor is a delivery ramp 95 (adjustably supported as hereinafter described) which terminates at its lower end in a rounded nose 96 which projects laterally partly over the folder flap 45 and partly beyond the outer edge of the folder flap so that the label L7 can be applied to the file folder with a portion thereof containing one of the digits "7" projecting clear of the folder flap and of course clear of the conveyor support runner 13.

Extending downwardly from the upper end of arm 91 is arm 97 swingably mounted on shaft 92. Arm 97 carries a laterally projecting guide roll 98 over which the web 94 to which the labels L7 are attached are guided. This arm 97 is spring urged rearwardly by an endless spring 162 which passes around stub shaft 92 and a polished cylindrical block 163 carried by a transverse arm 121 secured to the upright arm 91 and passes over an idler pulley 164 carried at one side of arm 97 by an arm 165 secured to an extending transversely of arm 97. A stop 166 carried by arm 165 is arranged to engage arm 91 to limit rearward movement of arm 97. The spring 162 also acts as a brake to prevent over-running of reel 93 as the labels are drawn off.

Projecting upwardly from the rear of the ramp 95 is a wall 99 which carries adjacent its upper end a further guide rod 112 around which the carrier web 94 with the labels attached are led prior to leading the web and labels down the ramp 95. Adjustable guide blocks 113 mounted on the ramp and adjustable by adjusting screw control 113' (see FIG. 10) properly centre the labels and their carrier and as the labels and carrier web are delivered down the ramp, they are maintained in contact with the ramp by an upper guide spring finger 114 carried by a block 115 secured to the wall 99 by rod 116. An oppositely directed longitudinal spring finger 117 secured to a block 118 also carried from the wall 99 by a rod 119 extends down and beyond the rounded nose of the delivery ramp and carries a resilient applicator pad 120.

Mounted on the transverse arm 121 is a second stub shaft 122 on which is mounted a take up reel 123 for taking up the carrier web 94.

The drive for effecting label feed comprises drive motor 124 (FIG. 10) which drives through belt drive 167 a particle clutch 125, a drive shaft 126 which passes through a particle brake 127 and is coupled by means of coupling 128 to a reduction gear box 129. The clutch and brake mechanism operate on the principle that when subjected to an electro-magnetic field, an effective drive connection, e.g. between the motor shaft and drive shaft 126, is accomplished in the case of the clutch, whereas the removal of the electro-magnetic field disengages the motor and drive shaft. In the case of the brake the energization of the brake acts to hold the drive shaft 126 against rotation whereas removal of the energization frees the drive shaft for rotation.

An output shaft 130 from the gear box 129 is coupled through coupling 131 to drive a shaft 430 on which is mounted a large knurled wheel 132. The ramp 95 is swingably supported from shaft 430 by means of bearings 168 and 168' carried by ramp wall 99 and a bracket 133 secured to the front of the ramp 95 (FIGS. 8 and 10). A pressure roller 134 journalled eccentrically between a pair of discs 135 journalled in ramp wall 99 and ramp bracket 133 is normally resiliently urged towards the knurled wheel 132 by springs 137 connected to legs 138 secured to the discs 135 and to fixed legs 139. A handle 141 is connected to one of the discs 135 is provided to retract the pressure roller 134 from engagement with the knurled wheel 132.

To feed the labels, the backing web or carrier 94 is led around the ramp nose 96 and up between the knurled wheel 132 which can be positively driven and spring loaded pressure roller 134 and onto the take up reel 123.

As the direction of the carrier web 94 is sharply reversed around the nose of the delivery ramp 95, the labels L which are relatively stiff, are peeled from the backing web and are delivered forwardly beneath the applicator pad 120 which presses the forward exposed portion of the label on to the file folder flap 45. It will be understood that the label feed and folder feed will be such that both have the same linear speed so that as the labels contact the file folder flap they will be travelling at the same speed and there will be no relative movement therebetween.

Once the initial portion of the label L is applied to the file folder flap, the forward feed of the file folder will continue to draw off the label so that the entire label will pass beneath the applicator pad 120 and will be firmly adhered to the file folder flap by means of the pressure sensitive adhesive.

The take-up reel 123 is driven by a friction drive 147 running between the knurled wheel drive shaft 430 and the stub shaft 122.

The ramp 95 as explained is swingably supported to swing on the axis of the knurled wheel drive shaft 430. The incline of the ramp is set by means of a threaded rod 142 secured by a block 143 to support rod 116 and projecting upwardly through cylinder 163. An adjusting nut 144 engaging the upper end of rod 142 limits downward movement of the nose end of the ramp and a spring 145 compressed between a nut 146 on rod 142 and the underside of block 163 urges the ramp to its lowermost position.

It will be seen from FIGS. 8 and 9 that the labels L (in this case the "7" label L7) are spaced a discrete distance apart on the carrier web 94. Arranged between the spring finger supporting blocks 115 and 118 is a sensor 149 which responds to the light change between a label and the backing web, that is, it senses the spaces between the labels, and after one label has been delivered in response to a signal to the clutch 125 to label, it senses the advance of one label and in the absence of a continuing signal to label, signals the clutch to release and the brake to apply to cease label feed.

It will be seen that the entire length of the file folder flap 45 is progressively moved beneath the delivery ramp 95 so that the labeller is in a position to deposit a label at any position or positions on the file folder flap or the labeller could label the entire flap from one end to the other, upon the proper signals being fed to the clutch and brake mechanisms. The manner in which the requisite signals are provided is hereinafter more fully explained in the description of the operation of the machine.

The labellers 100 to 110 are located precisely twelve inches apart corresponding to the twelve inch spacing between the clamps 33 and each file folder has to be acted upon by the labeller if it is going to apply a label during the travel of the file folder flap 45 therebeneath. In normal applications, about seven inches of the file folder flap are to be occupied by labels with each label occupying about 15/16ths of an inch, that is, each label is about 15/16of an inch wide in the direction of the numeral, e.g. numeral or digit "7." This arrangement provides for the application of up to seven labels with sufficient provision for space grouping of the labels. A frequent application is the application of a top label from the printer labeller 110 hereinafter more particularly described, and up to six colour coded digit labels selected from one or more of the labellers 100 to 109.

In as much as all of the labels to be applied by any one labeller (which could be six colour coded labels if the same digit were required for every colour coded digit position) must be accomplished on the transfer of one file folder beneath such labeller, that is, during the travel of the conveyor twelve inches, this twelve inch travel may be considered as one machine cycle.

As will be seen from FIG. 1, to provide for the folder feed a substantial distance is required between the point of delivery of the folder to the conveyor and the point of application of the first label at the end of the downwardly sloped delivery ramp 95 of the first or "0" labeller 100. This spacing is selected to be an integral multiple of machine cycles and in the machine illustrated the spacing is four machine cycles, so that it is only during the fifth machine cycle that the first folder delivered onto the conveyor is delivered beneath the delivery ramp of the first labeller 100. Since there are ten labellers delivering the colour coded digits "0" to "9," the machine will have passed through another ten cycles, that is, fourteen cycles, before the file is delivered beneath the printer labeller device 110 and this device will have printed fourteen labels in advance of the first file being delivered down the conveyor passing therebeneath for application thereto of the first printed label.

Printer Labeller Device

The combination printer 111 and labeller 110 employed in the present machine is a device commercially available from DI/AN CONTROLS, INC. of Boston, Massachusetts, U.S.A. and the device per se forms no part of the present invention and is shown in diagrammatic form only in FIG. 1. Briefly, the device comprises a main housing 150 from which is supported a supply wheel 151 containing a plurality of blank labels carried on a carrier web 152, the labels designated as $L_p$ having pressure sensitive adhesive on the underside thereof which temporarily secures them to the carrier web 152 and enables them to be peeled therefrom in the same manner that the labels L0 to L9 were carried by their carrier webs. The blank labels and web are led over an idler roller 153 to the print wheel 154 which can print on instructions up to three digits repeated in spaced relation (see FIG. 25) so that on application of the tab and folding it about the edge of the file folder flap, the numbers will appear on opposite sides of the file folder flap.

It will be understood that the printer device will also be capable of printing up to three letters if an alphabetic format is desired, and it will be also appreciated that the number or letters can also be reproduced in, for example, OCR type at one edge of the tab for machine reading, as hereinafter more fully described.

After passing the printer device 111, the carrier web with the now printed labels is passed around idler rollers 155 and 156 and down a delivery ramp 157 corresponding to the delivery ramp 95 described in detail with respect to the L7 labeller 107, and around a nose 158 of the ramp threading through a series of rollers generally designated at 159, one of which will include a driven roller to take-up reel 160.

It will be understood that the idler rolls 155 and 156 will be arranged so that between the printer device 111 and the delivery point of the label at nose 158, there will be fourteen printed labels corresponding to the fourteen file folders that will have been placed on the conveyor in fourteen machine cycles to bring the first deposited file folder into position to receive the first printed label from the printer labeller device 110.

Normally, as explained, this first printed label will occupy the first position $P_1$ (FIG. 21) on the first file folder flap 45 which will have already received the colour coded digit labels at the other positions which are to be labelled in accordance with the instructions to the labellers 100 to 109.

As the conveyor advances the first folder beneath and past the printer labeller device 110, it passes beneath a spring guide 161 to the label fold-over device 6.

Label Fold-over Device

Figure 12:
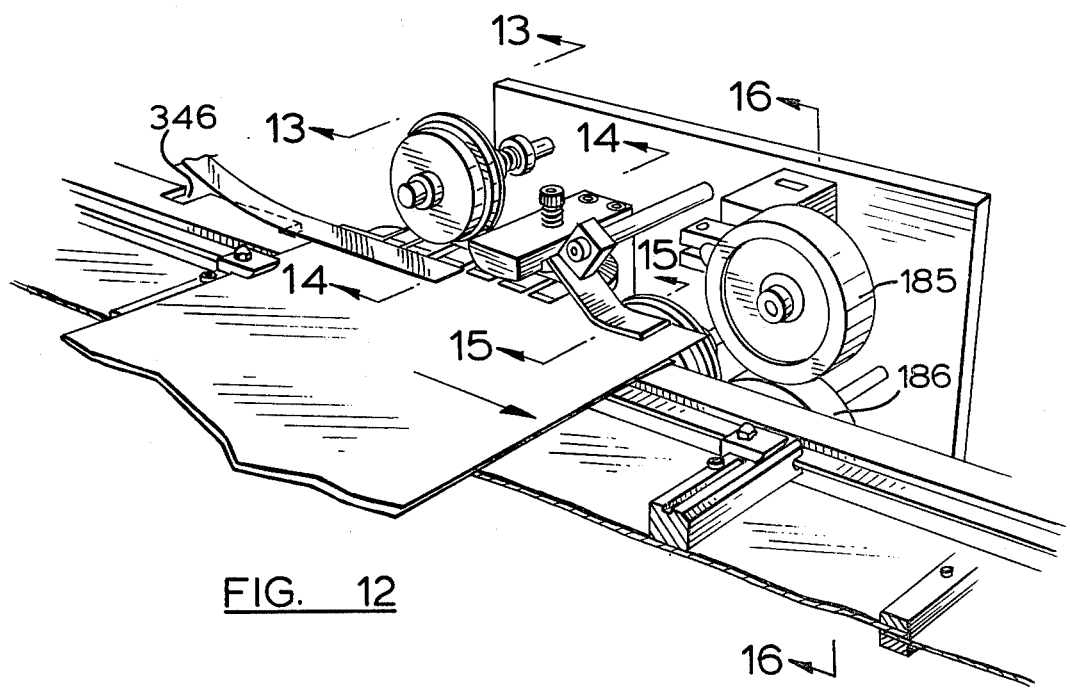
FIG. 12 is a view similar to FIG. 11 but showing the file folder advanced and the labels turned over.
Figure 13:
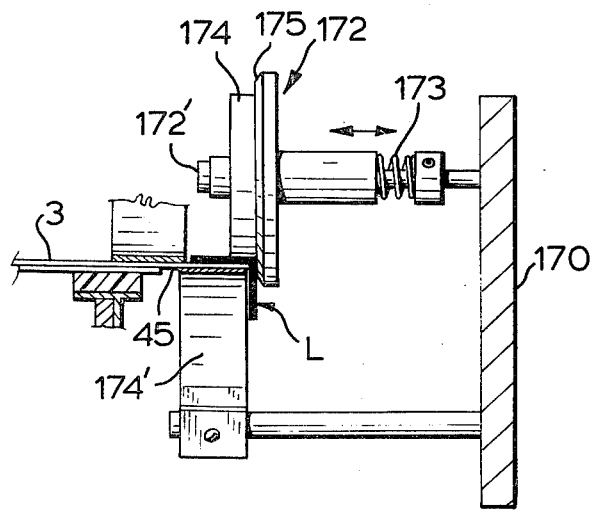
FIG. 13 is a vertical sectional view on the line 13—13 of FIG. 12.
Figure 14:
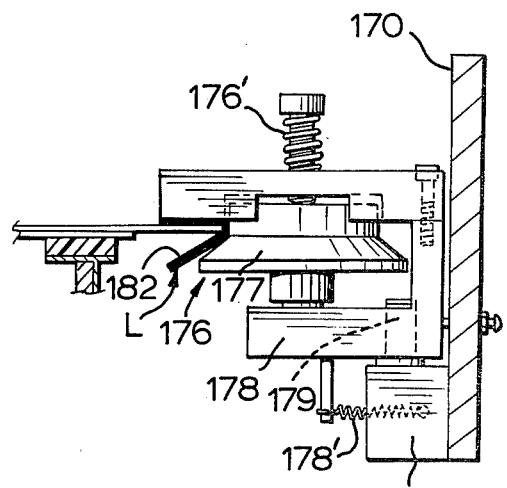
FIG. 14 is a vertical sectional view on the line 14—14 of FIG. 12.

With reference to FIGS. 11 to 16 inclusive, the label fold-over device 6 has a vertical mounting plate 170 which is supported forwardly of the front face of the support table 1 by suitable supports 171 (FIG. 1). This plate carries a first wheel 172 having a bevelled flange 175 and this wheel rotates on a horizontal axle 172'. Wheel 172 is spring loaded under action of spring 173 towards the forward edge of the folder flap 45 so that the cylindrical portion of the wheel 174 engages the upper surface of the labels L while the undersurface of the folder is supported by a spring finger 174' mounted from wall 170 and the bevelled flange 175 engages and turns the projecting portions of the labels L downwardly at right angles, as illustrated in FIG. 13.

A second wheel 176 having a bevelled flange 177 is rotatably supported to rotate about a vertical axis in a yoke 178 swingably supported on pin 179 carried by mounting block 180 secured to the mounting plate 170. Wheel 176 is spring urged by spring 176' upwardly and the yoke 178 is urged inwardly by spring 178', the arrangement being such that the body of the wheel 176 engages that portion of the label which abuts the edge of the folder flap 45 and the bevelled flange portion 177 turns the portion of the label below the folder flap upwardly.

Figure 15:
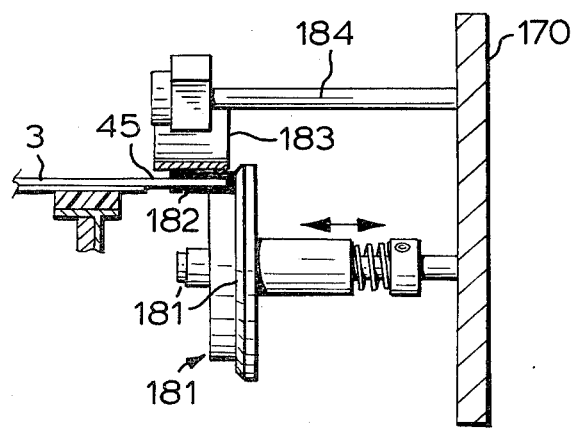
FIG. 15 is a vertical sectional view on the line 15—15 of FIG. 12.

A third wheel 181 having a bevelled flange 181' corresponding to the wheel 172 engages the inwardly turned label portion 182 and forces it upwardly into contact with the underside of the folder flap 45, as shown in FIG. 15.

A spring finger 183 supported by bar 184 from the mounting plate 170 maintains the folder flap from upward movement as it is engaged by the flanged wheel 181.

Figure 16:
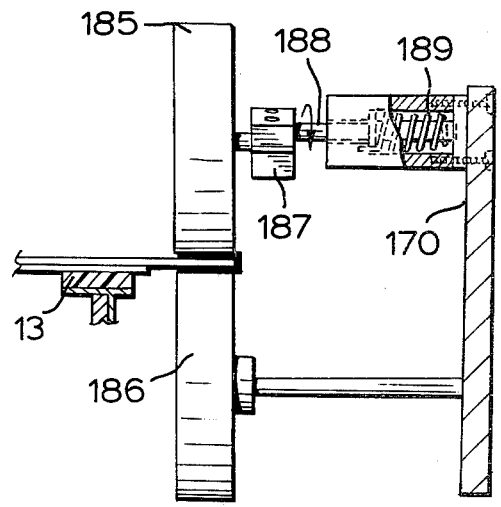
FIG. 16 is a vertical sectional view on the line 16—16 of FIG. 12.

Finally as the file folder is further advanced, the flap 45 is delivered between a pair of rollers 185 and 186 to apply a final positive compressive pressure to ensure fixing of the labels on opposite sides of the file folder flap. To ensure positive pressure, the upper roller 185 is carried by a crank arm 187 mounted on a shaft 188 which is urged in a clockwise direction as seen in FIG. 12 under action of torsion spring 189 (FIG. 16).

Machine Reading Station

As explained above, the colour coded labels applied by the labellers 100 to 109 and the printed label applied by the printer labeller 110 have machine readable markings which correspond to the indicia, i.e. the digits on the labels. Such machine readable markings may be OCR markings or bar code markings, as desired, and there are presently on the marketplace reading "wands" or machines which scan these markings, register them and store them in a memory bank for print out or display. Thus the actual labels applied to the file folders as they are delivered through the machine can be read by the reader 7 and these actual readings can be compared with the instructions given to the machine, as hereinafter more fully described, to determine that the machine has performed in accordance with the instructions given.

Machine Timing

With reference to FIG. 17, it will be seen that the chain drive 29 also drives through coupling 190 and gearbox 191, a gear shaft 192, one revolution of which equals twelve inches of feed of the conveyor and one machine cycle. Mounted on the shaft 192 is a gear 193 which meshes with a gear 194 carried on a swingable arm 195 (FIG. 18) which is normally clamped in position by clamp 196 to hold gears 193 and 194 in mesh, and which can be released, as indicated by the dotted line showing, to swing gear 194 clear of gear 193. Associated with and fixed to rotate with gear 194 is a main code wheel 197 and an auxiliary code wheel 198. The main code wheel 197 is provided with a series of projections 199 which are adapted to pass a proximity switch 200 to generate a label placing pulse to the labellers 100 to 109. The code wheel 197 and proximity switch 200 may be considered a pulse generator to provide instructing pulses to the labellers to label in the desired format, it being understood, however, that no labeller will actually deposit a label unless it receives further instructions that a label is required, as hereinafter further explained. With the code wheel 197 disclosed in FIG. 18, the labelling format calls for a first and second colour coded label immediately adjacent each other, a space, then a third and fourth colour coded label immediately adjacent each other, then a space and a fifth and a sixth colour coded label immediately adjacent each other, that is, looking at the projections 199 and viewing them anti-clockwise from the top, the spacing between the second and third projections is greater than between the first and second and the spacing between the third and fourth is the same as the spacing between the first and second, while the spacing between the fourth and fifth is the same as between the second and third and of course, greater than the spacing between the first and second. The spacing between the fifth and sixth projections is equal to the spacing between the first and second and between the third and fourth projections.

The auxiliary code wheel 198 carries a pair of projections 201 located between the more widely spaced second and third and fourth and fifth projections 199. The projections 201 are adapted to pass by a second proximity switch 202 to provide a signal to the labeller brake mechanisms 127 to ensure that labeller feed is delayed to accord to the desired spacing format set by the projections 199.

Figure 19:
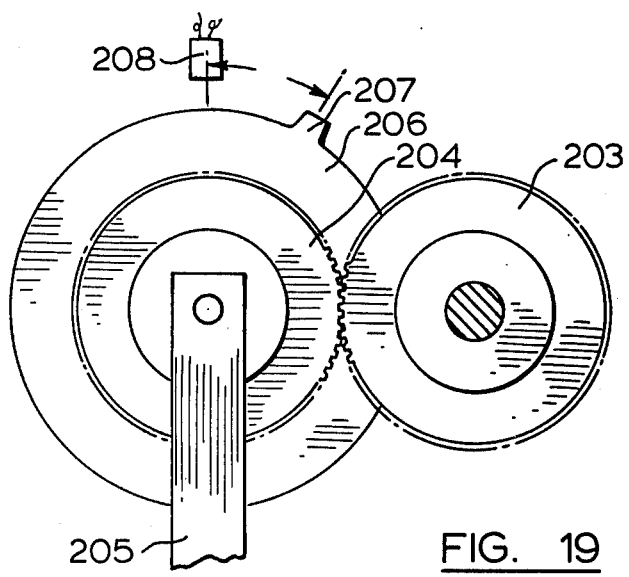
FIG. 19 is a vertical sectional view on the line 19—19 of FIG. 17.

Shaft 192 also carries a gear 203 which meshes with a gear 204 carried on an arm 205 (FIG. 19) which is similar to the arm 195 to enable the gear 204 to be swung into and out of mesh with gear 203. Associated with gear 204 is a code wheel 206 which carries a projection 207 that is adapted to actuate proximity switch 208 to form a pulse generator to deliver a pulse or instructing signal to the printer labeller 110 to cause the labeller 110 to deposit a label at the first or printed label position $P_1$ on the folder flap. Thus with the arrangement of code wheels illustrated in FIGS. 18 and 19, the machine is set to deposit on the file folder flap 45, in physical sequence but not in time sequence, a printed label in the uppermost or printed label receiving position $P_1$ a pair of colour coded labels bearing the appropriate digits at positions $P_2$ and $P_3$ then after a space, a second pair of colour coded labels bearing digits at positions $P_4$ and $P_5$, then after a further space a final pair of colour coded labels bearing digits at positions $P_6$ and $P_7$, (the layout illustrated in FIG. 21). Thus the arrangement provides for the applying or depositing of labels at seven different positions $P_1$ to $P_7$. It will be appreciated, however, that the format of these labels and the number of labels deposited can be changed simply by changing the code wheels by disengaging gear 193 to take code wheels 197 and 198 out of operation and swinging in corresponding code wheel assemblies indicated in dotted lines at $C_2$, $C_3$, $C_4$ and $C_5$ (with proximity switches corresponding to switches 200 and 202 being activated so that the position and number of the projections vary to meet the desired labelling requirements. Similarly, the position of the printed label can be changed by replacing or changing the position of code wheel 206 relative to its driving gear 204.

Also carried on the shaft 192 is a first collar 209 carrying a projecting finger 210 which is arranged to pass a proximity switch 211 to provide a pulse which signals the initiation of the machine cycle, hereinafter referred to as the "conveyor data transfer pulse." A similar collar 212 carrying a finger 213 co-operates with the proximity switch 214 to provide a signal for enabling the folder feeder or placer mechanism to deliver a folder to the conveyor. However, as hereinafter more fully explained, for the folder feed mechanism to actually deliver a folder, it must also receive a signal from the control unit that the control unit is ready to output data.

A third collar 215 carries a projecting finger 216 which co-operates with a proximity switch 217 to provide a signal to check folder present and this signal along with the actual sensing signal by the folder detecting device or sensor 82 provides a signal to turn the data output on from the control unit, as hereinafter more fully explained.

Control Unit

With reference to FIGS. 20, 20A and 20B, the control unit generally designated at 219 is a logic controller, the steering system or heartbeat for which is a multiplex address counter (MXAC) 220 driven by a master multiphase clock 221 (FIG. 20). The master clock 221 of the machine illustrated operates at 27 Kilohertz and moves through 16 phases or steps to produce one system or MXAC step when there is data present to be operated on.

The control unit is adapted to instruct the labelling devices 100 to 110 to apply labels in accordance with three different modes of input. The first mode of input is via a keyboard 222 in which the numbers to be applied to the file folders (in the numeric application of the machine), are typed on the keyboard 222. Alternatively, the instructions to the labeller can be given via punched cards read by a card reader 223, thus for example the files to be labelled will have the numbers, in the case of the numeric application, punched out on cards, one card for each file folder to be labelled, and the cards will be read in sequence and the labellers will be instructed to label accordingly. It will be understood that both with the keyboard mode and card reader mode of introducing data into the control unit 219, the filing numbering can be completely at random.

The third mode of instructing the labellers is via a sequential mode input 224 by means of which when in the numeric sequential mode the labellers are instructed to label a series of files with sequential numbering.

The system can also control the printing of the labels which can be printed with numbers or letters which labels are placed by the labeller 110, and can place pre-printed colour coded labels carrying letters as hereinafter described but for the purposes of the following description, the applying of printed label and preprinted colour coded labels bearing digits will be described in detail.

Suppose the first file is to be labelled with the number appearing in FIG. 21, that is, the number 103,271,035, with a printed label bearing the number 103 at $P_1$ and sequential colour coded labels bearing the digits 2, 7, 1, 0, 3, 5 at $P_2$ to $P_7$. In the case of the keyboard, this number would be typed into the control unit keyboard 222 and this information translated into the ASCII code would be strobed by the keyboard digit by digit via lines 225 to a latch and gate device 226. The data representing the first digit "1" is strobed into the latch and gate 226 on punching the keyboard "1," and is held latched therein until the operator punches the second digit "0" on the keyboard, etc. The data in latch and gate 226 representing the digit "1" is strobed out of the device 226 immediately after entry and before the operator can punch in the next digit by a pulse from the master clock 221 fed in on line 226'.

The data representing the first digit "1" which is the first digit of the number 103 to be printed by the printer 111 on a label which is to form a printed label $L_p$ to occupy the first position on the flap 45 of a file folder is delivered directly via the main bus 255 and through a selector 400 to a No. 1 PRINTER REGISTER latch and gate 320 (FIG. 20A) as hereinafter more fully described, and to a display unit 500 in the left hand or Most Significant Digit (MSD) display position 501. At the same time this data is delivered to the first or left hand or Most Significant Digit (MSD) counter of a series of ten counters 228 adapted to receive and store until required the data representing up to ten digits of a ten digit number with the Most Significant Digit (MSD) digit data stored in the first of left counter and the Least Significant Digit (LSD) data stored in the tenth or right hand or Least Significant (LSD) counter 228.

The counters 228 are selectively connected into the system through a multiplex unit 230 connected directly to the MXAC 220 through a selector 229 when the latter is in the A mode and to the MXAC through the sequential mode input 224 when the latter is selected as the input mode and the selector 229 is in the B mode.

Immediately upon the first digit "1" being typed on the keyboard and strobed to the latch and gate 226 it is introduced into the system by an output enabling pulse on line 226' from one of the phases or pulses of the master clock 221 which also enables multiplex unit 230 via a preset enable command delivered to the multiplex unit on line 231. At this time the MXAC 220 will be step 1, i.e. MXAC 1 and will be addressing the left hand or MSD counter 228 to direct the master clock enable pulse on one of the lines 232 to the left hand MSD counter 228 to render it operative to receive the data from latch and gate 226 via the lines 255' connected to the main bus 255. Since each of the counters 228 is required to receive and store digits only from "0" to "9" and since data representing such digits requires only 4 of the 7 lines, the lines 225' comprise 4 lines only.

The latch and gate 226 and the MSD counter 228 retain the data representing the first digit "1" following completion of delivery of this data to the counter but the master clock advances the MXAC 220 to step 2 (MXAC 2) where it stops awaiting the input of the next data into latch and gate 226 and the next output enabling signals from the master clock on lines 226' and 231. When the second digit "0" of the number 103,271,035 is strobed into the latch and gate by the operator pressing the "0" key, the "1" digit data in latch and gate 226 is replaced with the "0" digit data and this data is immediately thereafter put into the system in the same manner as before. That is, the master clock enable command on line 226' outputs the data "0" down the main bus 255 to the No. 2 Printer Register latch and gate 323 (FIG. 20A) and to the display unit 500 directly through selector 400. This enable command, of course, also puts the data on lines 255' and into the second from the left hand counter 228 which, at this time, is being addressed by MXAC 220 at MXAC 2 and is enabled by the master clock pulse on line 231 to accept the data.

Similarly when the third digit 3 is typed on the keyboard and delivered to the latch and gate 226 the MXAC is advanced to step 3, MXAC 3, and on the respective enable commands this data is put on the bus 255, delivered via selector 400 to display 500 and to the No. 3 Printer Register latch and gate 325 and also delivered via lines 255' to the third from the left hand counter 228 (the third most significant digit counter).

Since the right hand counter 228 always stores the least significant digit data, LSD, regardless of whether the number contains ten or fewer digits, then one or more of the counters 228 will not store digit data. In the case of the number 103,271,035, starting from the right hand counter 228 which is to store the data for digit "5," the 2nd, 3rd, 4th, 5th and 6th from the right counters will store, respectively, the data for the digits "3", "0", "1", "7" and "2." On the other hand, the first three counters at the left receive the data with respect to the digits "1", "0" and "3" for the first label. To accommodate this system the 7th from the right or 4th from the left counter 228 must store data representing a "space" rather than a digit. Therefore after entry of the digit "3" the operator presses a keyboard "space" button, the data for which is strobed into the latch and gate 226 replacing the "3" data. As MXAC 220 has by this time been advanced to step MXAC 4 to address the 4th from the left counter, the appropriate output enable master clock pulses in lines 226' and 231 will cause this "space" data to be entered into this addressed counter. At this time subsequent to the entry of the third digit "3" the selector 400 has switched from feeding data directly through to the display unit 500 from the the bus 255 and instead connects the display unit via the multiplex unit 230 to, in this case, the 4th from the left counter in which the space data is stored and latched, and the display will not register and display a digit at this point, but will leave an empty space. Following delivery of the "space" data the MXAC is advanced to the next stop MXAC 5.

The operator next keys in the digit 2, the data for which is strobed to the latch and gate 226. Again this data is subsequently outputted on receipt of the appropriate master clock enabling pulse to the fifth from the left counter 228 which is also enabled by the pulse on line 231 directed to this counter by virtue of its being addressed by the MXAC at MXAC 5. From this counter the data is delivered via multiplex unit 230 and selector 400 to the display 500. This procedure continues until the remainder of the counters are addressed to the MXAC and store from the 6th from the left to farthest right (LSD) counters, respectively, the digits "7," "1," "0," "3," "5" and the display unit 500 displays the number 103, 271, 035 The input cycle is then complete and the control unit is ready to output data immediately after the keyboard operator punches an "enter data" button 221(a). Until button 221(a) is actuated, the keyboard can be cleared by punching a "clear" button 221(b) as in conventional keyboard operation. MXAC 220 is reset back to MXAC 1, ready to move successively through its ten address steps again to output the data from the printer registers 320, 323 and 325 and the counters 228.

It will be understood that if the printer 111 is to print only a two digit number, e.g. 13, instead of 103, the first entry in the keyboard would be a space and this space would be presented as data to the latch and gate 226 and transferred from there into the control system as "space" data to the No. 1 Printer Register latch and gate 320 and as well to the MSD or left hand counter 228. If the printer label only required a one digit number then the operator would enter two "spaces" before the digit to be printed. If the number for example to be applied to the file folder were 1000, the "1" constituting a printed label and the "0's" constituting colour coded labels, the operator would key in space, space 1, space, space, space, space, "0," "0" and "0."

Since in effect for the keyboard mode the first 3 left hand counters are not utilized to output the data to the printer registers 320, 323 and 325 and their stored data is not otherwise used, the keyboard may be used to input letters to the printer registers via the full ASCII code bus 255 but only four line code can be delivered to the remaining seven counters 228 so that they can only accept data relating to digits although this data can be translated at the labellers so that, for example, the data representative of the digit "0" can be arranged to operate a labeller which labels a letter "A" as opposed to the digit "0," etc.

When the card reader mode is employed by use of the card reader 223, the card will be punched say for the number 103, 271, 035 with the left hand of a ten column format being punched out corresponding to the data representing the digit 1. The digit 0 will be punched out in the second to the left hand column and the digit 3 in the third to the left hand column. These three left hand column punch outs will control the information for the printer 111.

The least significant or right hand digit 5 of the number will be punched out in the right hand column, the digit 3 in the second to the right hand column, etc., and the seventh from the right hand or fourth from the left hand column will not be punched out which yields a "space" data and when the card is read and strobed into and clocked out of the latch and gate 234 via enable command line 234' in the same manner as latch and gate 226, the print number 103 will occupy the No. 1, No. 2 and No. 3 PRINTER REGISTER latch and gates (and as well as three left hand counters), the colour code digits "2," "7," "1," "0," "3," "5" will occupy the six right hand counters, and the seventh from the right counter will contain "space" data. As before, the data representing the first three digits "1," "0," "3" will be delivered by the bus 255 directly to the Printer Registers and display 500 through selector 400 (as well as being presented to the first three counters 228) while the "space" data and the remaining digit data will be delivered to the remaining seven counters 228 and from the counters through unit 230 and selector 400 to the display 500. Again, since the first three pieces of data go directly through the selector 400 on the main bus 255 which can carry the full ASCII code to the three printer registers this data can be representative of letters as well as digits so that the printers can be instructed to print letters. In this case the first three counters will only receive incomplete data on the four lines connected thereto and the letters will not be stored therein.

The sequential mode input 224 is connected to the MXAC 220 through decoder 235 and is controlled by a plurality of thumb wheel switches comprising the sequential thumb wheel switch 236, the start thumb wheel switch 237 and the stop thumb wheel switch 238. Each of these switches comprises a bank of ten independent switches 0 to 9, each with ten switch positions 0 to 9, so that any ten digit or fewer digit number can be set up in the switches, the first switch 236 setting the incremental sequence increase, the start switch 237 setting the starting number and the stop switch 238 setting the stop number. In the sequential mode setting the MXAC output is delivered through the sequence thumb wheel switch 236 via the B mode of selector 229 to the multiplex unit 230 to control the address of the counters 228 and hence their acceptance of data. The data output from the sequential mode device 224 commencing with the start number set on the start thumb wheel switch 237, is delivered via latch and gate 239 corresponding to the latch and gates 226 and 234 to the bus 255. The sequential mode input 224 has a numeric/numeric mode and an alpha/numeric mode. In the first mode which is the one hereinafter more particularly described, only digits are to be handled, in which case all of the output data including the print label digits data goes via the counters 228, through the multiplex unit 230 and selector 400 to the display 500, the printer registers 320, 323 and 325 and to the labellers, as hereinafter explained. In the alpha/numeric mode, letters can be supplied to the printer registers directly by the bus 255 and selector 400 through the keyboard.

In the numeric/numeric mode, if the sequence of file folders were to be labelled from the number 103,271,035 to 103,271,135 in increments of one, the initial number 103,271,035 would first be delivered to the counters through the latch and gate 239, under master clock clocking signals delivered thereto on line 239', with the data representing the digits 271,035 occupying respectively, the six right hand counters. All of the data will be applied through multiplex unit 230 and selector 400 to the display 500 and the data representing the first 3 digits will be applied to and stored in the printer registers 320, 323 and 325. When this data has been removed from the counters on machine operation, as hereinafter more fully explained, the next sequential number will be delivered to the counters. A stop count complete or sequential mode control 240 is provided which on receiving output from the sequential mode device 224 when the number reached is that number set on the stop thumb wheel switch 238 and output from the multiplex unit 230 will stop data feed.

It will be understood that a suitable control is provided to select the mode of data input, keyboard, card reader or sequential mode.

MACHINE OPERATION and Outputting Data from Printer Registers and Counters

With reference to FIG. 20B, after the input data from one of the input modes Keyboard, Card Reader, or Sequential for the first file folder to be labelled has been delivered to the Printer Registers 320, 323 and 325, and the counters 228, a DATA READY TO BE OUTPUT signal 241 is delivered on line 242 to an AND gate 243. This signal will be automatically applied by the card reader input 223 and the sequential mode input 224 but is applied in the keyboard mode only when the operator actuates the enter button 221a as described. If the conveyor is running, then the passage of the finger 210 carried by the gear shaft 192 past its proximity switch 211 creates the conveyor data transfer pulse from switch 211 and this pulse is fed to AND gate 243 which provides an output signal to Output Data Box 244 which initiates the MXAC 220 to commence its address of the counters 228 in sequence and to deliver a signal to a further AND gate 245.

As the machine is operating, proximity switch 214 will receive a pulse on passage of finger 213 to provide a folder placer timing pulse and this signal along with the DATA READY TO BE OUTPUT signal, is fed through AND gate 243' to turn on the folder feed or placer mechanism 5 to feed or place a folder on the conveyor 2. Subsequently proximity switch 217 will send a signal to an AND gate 246 and since the folder placer has delivered a folder to the conveyor, the folder present detector or sensor 82 will also deliver a signal to AND gate 246 and this AND gate will output a signal to set a set/re-set device 247. The output from the folder present detector is also connected through inverter 311 to a further AND gate 248. The check for folder signal is also applied to AND gate 248 which is connected to the re-set component of the set/re-set device 247. With the folder present, the signal is delivered through the set/re-set device 247, through branch connection 250 down to AND gate 251 which also receives the DATA READY TO BE OUTPUT signal and this AND gate 251 transmits the signal to the print unit, the functioning of which is hereinafter described. The signal passing through the set section of the set/re-set device 247 is also delivered to an AND gate 252 which is connected to a unit 253 designated NUMBER OF DIGITS LEFT TO BE ADDRESSED by MXAC LESS THAN OR EQUAL TO INDIVIDUAL TAB THUMB-WHEEL SWITCH. This control 253 is governed by a thumb-wheel switch 253' which is set at the number of colour coded labels to be applied, e.g. at 6, in the case of the number 103, 271, 035 and holds off outputting of data from the DATA OUTPUT FORMATTER 259 until, in the example MXAC, 220 addresses the fifth from the left counter 228, that is, until MXAC5.

From AND gate 252 the signal is fed in two directions; the first to selector 254 connected to the main bus 255 to acuate same to the B mode to allow the throughput of digit data from the counter addressed by the MXAC 220, i.e. the data from the fifth counter 228 from the left to MXAC5, the sixth counter from the left on MXAC6, etc.

The signal from AND gate 252 is also passed to AND gate 245 which also receives a signal from the output data box 244 resulting in the AND gate passing the signal to OR gate 258 and through this gate to start Data Output Formatter 259. This latter device is the control device which controls the entry of the data in the counters 228 into a bank of shift registers 270–282 inclusive which supply the data to the individual labellers 100 to 109, as hereinafter described.

Since the data respecting the first digit relating to the colour coded labels, namely the digit "2" in the number under consideration 103, 271, 035, is in the fifth from the left counter 228, the Data Output Formatter 259 does not receive its signal to start from the number of digits left to be addressed by MXAC control 253 until MXAC5.

Upon receiving this start signal through OR gate 258, at MXAC5, the data output Formatter 259 which is synchronized with the Master Clock 221 clocks the digit "2" data into the first step of the first of thirteen successive shift registers 270 to 282 inclusive. These shift registers happen to be 16 step shift registers because such are a standard commercial commodity. Therefore after the data representing the digits "7," "1," "0," "3" and "5" is also clocked into register 270 during MXAC steps 6, 7, 8, 9, 10 the formatter 259 delivers 10 dummy pulses to clock the six digits down to the bottom six steps of register 270 ready for transfer to the next successive register 271. In the meantime MXAC 220 will have completed its 10 step cycle and be returned to its inactive state ready to address the counters again. That is, once the digits 2, 7, 1, 0, 3, 5 have been entered into shift register 270 and clocked down to the bottom of the register, and the counters 228 and the printer registers 320, 323 and 325 as hereinafter explained, will have been emptied of their data and be ready to accept data respecting the labelling of the next subsequent file folder when addressed by MXAC 220. If, for example, the control unit is in the card reader mode, the card reader will then read the next card and the MXAC will effect delivery of this data to the printer registers 320, 323 and 325 and to the counters 228 as previously explained where it will be stored awaiting the next machine cycle which will occur on the next passage of the conveyor data transfer pulse finger 210 passing proximity switch 211, which occurs one revolution of gear shaft 192 from the previous pulse. As explained, during this revolution of the gear shaft 192 the conveyor will have advanced the first file folder which is to receive labelling with the number 103, 271, 035, a distance of twelve inches. Suppose that the next file folder is to receive labelling in which the print label is to bear the number 152 and colour coded labels 660, 031 (Number 152, 660, 031), then from the card reader the digits 1, 5, 2 will be placed in the No. 1, No. 2 and No. 3 Printer registers 320, 323 and 325 respectively, (and also the first, second and third left hand counters 228). The fourth counter again will have a "space" data placed therein and the sixth to the tenth counters will have data representing the digits 6, 6, 0, 0, 3, 1 placed therein, respectively. Then when the next conveyor transfer pulse occurs the digits 2, 7, 1, 0, 3, 5 will be clocked into the second shift register 271 and down to the final six steps therein. At the same time, the data representing the digits 6, 6, 0, 0, 3, 1 will be clocked into and down to the last six steps respectively to the first shift register 270, after which the control unit is ready to accept and will accept data from the third card containing the number to be applied to the third file folder. After this further data is stored in the printer registers 320, 323 and 325 and counters 228, the MXAC returns to its initial state, awaiting the next conveyor data transfer pulse which will occur when the conveyor has completed another cycle and advanced the first file folder twenty four inches and the second file folder twelve inches.

Because of the physical separation between the point of delivery of the file by the file folder feed or placer mechanism and the point of application of the first labeller or label placer 100, the machine is required to go through two more cycles before the first file folder is in a position to be delivered beneath the first or zero labeller for the application of the label thereto. Thus the first four machine cycles advance the first placed file folder into a position from which during the fifth machine cycle the folder tab will be passed beneath the lower or nose end 96 of the delivery ramp 95 of the "0" labeller 100 so that a label or labels from the "0" labeller can be placed at a position or a number of positions on the tab folder flap 45. This requires four shift registers 270 to 273 inclusive to advance the data with respect to the first file in step with the progress of the first file along the conveyor. During the fifth machine cycle, the data being put out from the fourth shift register 273 and delivered to the fifth shift register 274 is picked off and fed to control the "0" labeller 100 as hereinafter explained. Thus immediately prior to the commencement of the fifth cycle of the machine, the digits 2, 7, 1, 0, 3, 5 will be stored in the fourth shift register 273 and the digits 6, 6, 0, 0, 3, 1 will be stored in the third shift register 272. When the fifth conveyor data transfer pulse is given at the commencement of the fifth cycle of the machine, the data in shift register 273 will be transferred to shift register 274. It will be also picked up and fed, if applicable, to the first of ten labeller or label placer shift registers 290 to 299 respectively, namely labeller shift register 290 which controls the "0" labeller. Each of these registers 290 to 299 is an eight step shift register and these shift registers are clocked from the Data Output Formatter 259 and synchronized with the Master Clock 221 by signals fed in on lines 301 and 401 respectively, delivered through AND gates 302 and OR gates 305 to the registers. These registers 290–299 are re-set after each cycle by the next Conveyor Data Transfer Pulse delivered thereto on line 303.

Only seven of the 16 clocks of the Data Output Formatter are utilized to clock each of the shift registers such as shift register 290. This is because the system is set up to place a maximum of 7 COLOUR CODED labels at positions comprising a seventh position $P_7$ at the bottom of flap 45 for the least significant digit (LSD) to a first position $P_1$ at the top of the flap 45 for the most significant digit (MSD).

In respect of number 103, 271, 035, only six colour coded labels are to be placed for the digits 2, 7, 1, 0, 3 and 5 and one printed label for the number 103. The LSD 5 is therefore to occupy the seventh or bottom position $P_7$, the second LSD 3 is to occupy the sixth or second to the bottom position $P_6$, the third least significant digit 0 is to occupy the fifth or third from the bottom position $P_5$ and the sixth LSD 2 to occupy the second from the top position $P_2$. The printed label Lp is to occupy the first or top position $P_1$ on the flap 45.

As the data contained in the fourth shift register 273 is clocked out on the fifth control unit cycle into the fifth shift register 274, it is also delivered via feed lines 304' to a "0" digit detector 304 which delivers the data if it is a "0" as a "true" condition to the first or upper section of the shift register 290 which is an 8 step shift register. As the first digit clocked out of shift register 273 and into the top step of shift register 274 by the first clocking of Formatter 259 is the digit 2, this data is scanned by the "0" detector 304 and since the data is not representative of "0" a not true condition is clocked into the top step of shift register 290 from the "0" detector 304.

On the next clocking of Formatter 259 the digit data clocked out of shift register 273 and into the top step of shift register 274 is the data representing the digit 7, while the data representing the digit 2 is clocked down to the second step of shift register 274. Again this data representing the digit 7 is presented to detector 304 and since it is not representative of the digit "0" a second "not true" condition is clocked into the top step of shift register 290 while the previous "not true" condition is clocked down one step in this latter shift register. Similarly, when the data representing the digit 1 is clocked out of the fourth shift register 273 it will be clocked into the fifth shift register 274 and the previous data will be clocked down one step and a further "not true" condition will be clocked into shift register 290. However, on the fourth clocking of the Formatter 259 the "0" which had previously been clocked down to the bottom step of shift register 273 during the three previous Formatter clockings will be clocked out of shift register 273 and into the uppermost section of shift register 290 and will be detected by detector 304. Thus a "true" condition will be clocked into the first step of shift register 290. As the functioning continues, the 3 and 5 will be clocked out of shift register 273 and into shift register 274 but detector 304 will not detect any zeros and in each case a "not true" condition will be clocked into shift register 290. In the case of the number under consideration, shift register 273 will have been emptied of its digit data originally contained in its last six steps representing the digits 2, 7, 1, 0, 3, 5 respectively, on the sixth Formatter clocking (while the next succeeding digit data pertaining to the next succeeding file folder will have been introduced into its first six steps) and this data will now occupy the first six steps of shift register 273. The next 10 dummy steps put out by the Formatter on line 259' will clock the data down, in each case, to the bottom six steps of the respective registers 273 and 274.

In the case of the "0" labeller shift register 290 at the end of the 6th output pulse from Formatter 259 on line 301 will have, reading from the top, "not true," "not true," "true," "not true," "not true" conditions stored therein and these conditions will be clocked down one step each on the seventh clock of the Formatter 259 arriving on line 301, (seven clocks only being put out on line 301) so that the first entered "not true" condition will occupy the seventh or second from the bottom step of the eight step shift register 290.

The clocking of shift register 290 is also under control of code wheel 197 which, in the set up of the machine as illustrated and explained, provides for applying colour coded labels in only six positions on the flap 45. The signals from the code wheel 197 are delivered through OR gate 304 to clock out shift register 290 to clock the lowermost data at the second to the last step to the final step and then out of the register. If a "true" condition is clocked to this last step, the labeller 100 is actuated.

Thus, as the first pulse arrives for label position $P_2$ (the first colour coded label position), from the code wheel 197 upon passage of the first code wheel projection 199 past the proximity switch 200, this pulse is fed through OR gate 305 and the "not true" condition in the second to the bottom-most position in shift register 290 is clocked downwardly to the last shift register position connected to the "0" label placer. Since this label placer 100 is instructed to apply a label only if the condition clocked down is a "true" condition, and since the condition is "not true", the label placer will not be actuated and the file folder will move beneath the nose 96 of the ramp 95 to commence bringing the third position $P_3$ on the file folder flap in position to receive a label from the "0" labeller 100 in time with the passage of the second projection on code wheel 197 sending a signal through OR gate 305 to clock shift register 290. Again, since a "not true" condition will be clocked down to the bottom position of the shift register 290, (the previous not true condition being clocked out of the register) the "0" labeller will remain inactive. Similarly on the third input pulse from code wheel 197 a "not true" condition will be clocked down to the final position on the shift register 290 and again the "0" labeller will not apply any label at the fourth label position $P_4$ on the flap 45. However, on the fourth input pulse from the code wheel 197, a "true" condition will be transferred to the bottommost position of shift register 290 to actuate the "0" label placer to deposit an "0" label at the fifth label position $P_5$ as the file folder flap is fed therebeneath. Again, for the last two clockings there will be a "not true" condition and the "0" labeller will remain inactive and will not apply a label at the sixth and seventh label positions $P_6$ and $P_7$ respectively. As the clockings of the code wheel 197 are passed to OR gate 305, they are also passed to a clock counter 307 which records the label placement position and displays same on a display 308 as the code wheel rotates to signal label placement at the appropriate label positions where instructions to label "0" are contained in the shift register 290.

As explained, as the data is transferred out of shift register 273 and the "0's" are picked off and delivered as "true" conditions to the "0" labeller, it is transferred into and clocked down to the bottom of shift register 274 while the data relating to the second file folder is entered into and clocked down to the bottom of shift register 273. On the next machine cycle initiated by the (C.D.T.P. conveyor data transfer pulse) shift register 290 will be cleared or re-set from the pulse as will clock counter 307. and the data with respect to second file folder will, in the same manner as described above, be clocked out of shift register 273 and into shift register 274 while any "0" data relating to the second number will be picked off and placed in the shift register 290. In turn the data with respect to the first file folder number will be clocked out of shift register 274 and into shift register 275 and any "1" digit data will be detected and placed in the second shift register 291, which controls the "1" digit labelling. In this case, the one digit detector 304-1 will detect a "1" at the third output clock from shift register 274 (i.e. the fourth label position $P_4$) and when clocking is completed, shift register 291 will contain a "true" condition at the fourth position from the bottom. Then as the signals are delivered from the code wheel 197 to clock out the data from shift register 291 to the "1" label placer 101, there will be no instructions to place a label (i.e. "not true" conditions clocked down) as a result of the first two code wheel pulses but the "1" labeller 101 will be actuated on the third pulse to place a "1" label at the fourth label position $P_4$ (third colour coded label position).

On the next machine cycle, the digits 2,7,1,0,3,5 will be transferred out of shift register 274 into shift register 275 (corresponding to shift register 274 but shown only by number) and the digit "2" will be picked off and fed to shift register 292 (corresponding to shift register 291 but shown only by number) and clocked down to the second to the bottom shift register position ready to be clocked out to the bottom position to actuate the "2" digit label placer upon arrival of the first pulse from the code wheel 197. Thus the "2" digit label will be applied to the first folder at the second label position $P_2$ (first colour coded label position) as the first folder passes beneath the "2" labeller 102.

It will be understood that as the first file folder travels down the conveyor, it will in the same manner have applied thereto a "3" label in the sixth label position $P_6$ (fifth colour coded label position) by the "3" digit colour code labeller 103. Since no "4" is called for, no "true" condition will be clocked into the shift register 294 controlling labeller 104, but the fifth labeller will be instructed to place a "5" on the last label position $P_7$ (sixth colour code label receiving position). Again, no "6" will be called for but the seventh labeller 107 will place a colour coded "7" digit label in the third label position $P_3$ (second colour coded label position) between the "2" and "1" digit labels. Since no "8" or "9" is called for, the "8" and "9" labellers 108 and 109 will not receive any "true" conditions in their respective shift registers 298, 299 and therefore nothing will be clocked out to actuate these labellers by code wheel 197.

Had the first file required the number 103, 000, 000, it will be understood that the "0" digit detector 304 would on each clocking of the data out of shift register 273 have detected the "0" data, and would have transferred this data as a "true" condition into shift register 290, and this information would have been clocked down until it occupied the second to the last to the seventh to the last steps of shift register 290. Then as each finger of the code wheel 197 passed the proximity switch 200, instructions would be clocked out of shift register 290 to instruct the "0" labeller to place a "0" label at all 6 colour coded label positions (ie. at all label positions $P_2$ to $P_7$ inclusive). The file folder would then have received all of its required colour coded digit labels and of course, none of the detectors of the subsequent label shift registers 291 to 299 would detect any true condition as the data was clocked down the shift registers 271 to 282, so that no "true" condition would be transferred to shift registers 291 to 299 and no "true" condition would be clocked out of the shift registers by the code wheel and therefore the labellers 101 to 109 would remain inactive.

In a similar vein, if the number were 103, 999,999 as the digits "9" were transferred through shift registers 270 to 282, none of the decoders for shift registers 290 to 298 would deliver a "true" condition and the "0" to "8" labellers 100 to 108 would remain idle. However, the decoder 304-9 would provide a "true" condition at all of the second to last to the seventh to last steps of the "9" digit labeller control shift register 299 on clocking out the data in the final shift register 282. Thus on each of the six pulses from the code wheel 197 a "true" condition would be clocked down to the final labeller actuating position of shift register 299 and six "9" digit labels would be applied to the folder flap as same passed therebeneath.

Figure 18:
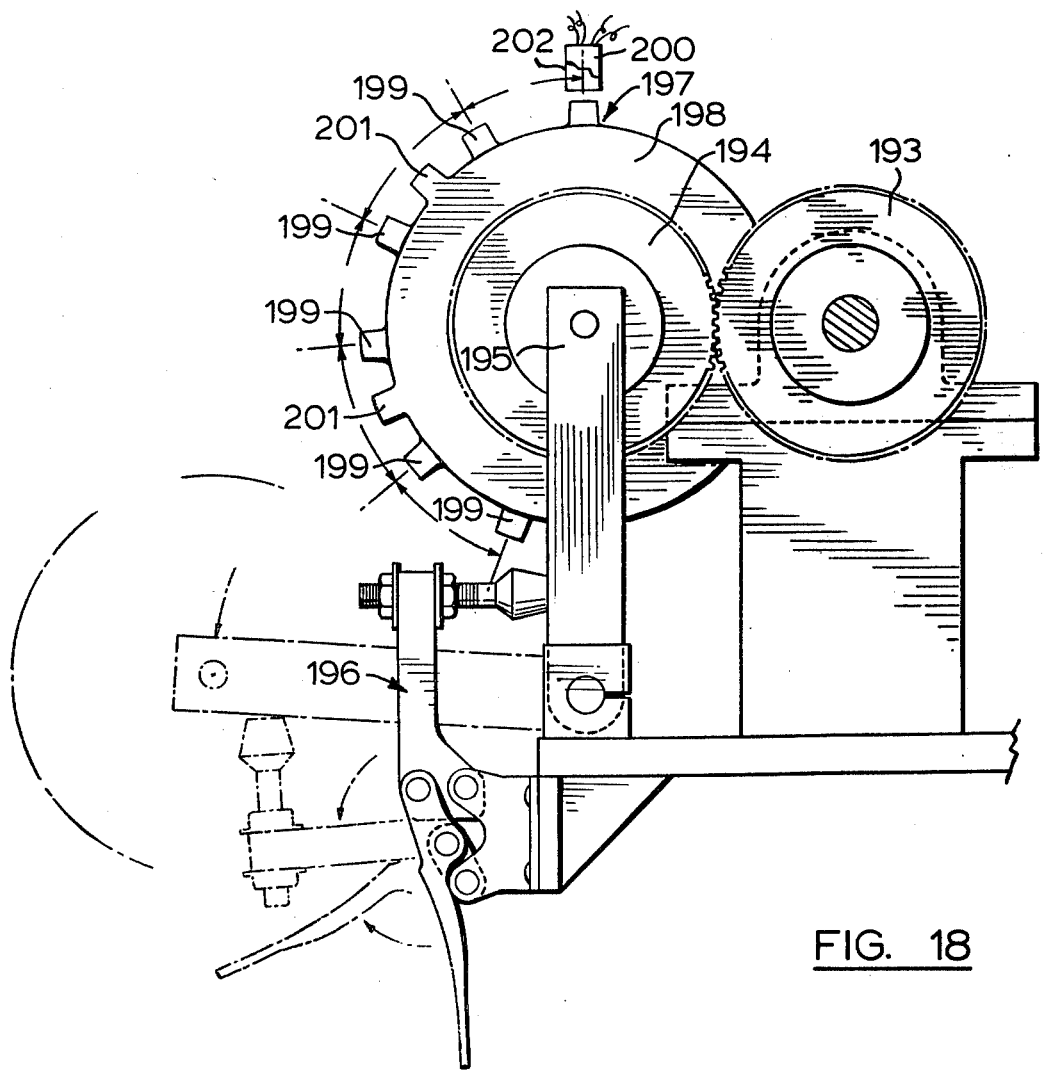
FIG. 18 is a vertical sectional view on the line 18—18 of FIG. 17.

As discussed with respect to FIG. 18, the fingers 199 of the main code wheel 197 are spaced to provide pulses which separate the third colour coded label from the second and the fifth colour coded label from the fourth to give the format illustrated in the FIG. 21. To ensure that the instructions from the main code wheel 197 are followed, the auxiliary code wheel 198 provides momentary braking pulses to the labeller brakes after the second and again after the fourth label has been applied.

It will be understood that as the first folder passes down the conveyor to receive the colour coded digit labels 271, 035, the second folder which is to have the number for example 152,660,031 applied thereto, will in the same manner as described above, have "0" digit labels applied thereto at the fourth and fifth label positions $P_4$ and $P_5$ (the third and fourth colour coded label positions) while the "1" label will be applied at the seventh label position $P_7$, the "3" label at the sixth position $P_6$ and the "6" label will be applied at label positions $P_2$ and $P_3$ as the second file folder is fed beneath the labellers.

Suppose for example the folder feeding or placer mechanism had failed to feed the third file folder to the conveyor, although the information relating to the labelling of this third file folder had been placed in the printer registers 320, 323 and 325 and counters 228 but of course the labellers should not be instructed to label because the third file would not be passing therebeneath immediately after the first and second file folders. However, on the next cycle of the folder feed mechanism, the third file may in fact be placed on the conveyor so that the labellers then should be actuated to label the third file.

To accommodate this problem of misfeed of one or more file folders to the conveyor, the signal from the CHECK FOR FOLDER PRESENT which is given by the proximity switch 217 on operation of the conveyor is fed to AND gates 246 and 248. At the same time since no folder is present the output of an inverter 311 connected to the folder present sensor 82 is also sent to AND gate 248. Of course, since no folder is present, no folder present signal is delivered to AND gate 245 which therefore does not conduct. Under these conditions, AND gate 248 delivers a signal to the re-set section R of the set-reset device 247 switching the device to deliver a signal to AND gate 313, which since the conveyor is operating also receives the conveyor data transfer pulse. AND gate 313 thereupon delivers a signal through the OR gate 258 to the Formatter 259 to start its output clockings. This is necessary because the data for the first two file folders must be clocked ahead in step with the advance of these file folders. However, selector 229 will not be switched to the "B" mode but will remain in the "A" "no data code" mode and as a result, no data will be clocked out of the counters 228 and into the shift register 270. However, data in the shift registers 270, 271, etc. will be clocked down and proceed step by step with the previously deposited files. The net result is that shift register 270 will be emptied and no fresh data will be introduced; the data previously in shift register 270 will have been transferred to shift register 271 and the data in shift register 271 will have been transferred to shift register 272. However, on the next machine cycle a file folder would be present, and selector 229 would be switched to the "A" mode in the manner previously described with reference to the depositing of the first folder to allow the delivery of the stored data in counters 228 to be fed to shift register 270 when the Formatter 259 is initiated when MXAC 220 addresses the first counter containing data for a colour coded digit label as set on Thumb-wheel Switch 253' and controlled by the unit 253.

After the first file folder has passed the last colour code digit labeller 109, it still is required to receive the printed label bearing the number 103. This label must be first printed and then applied. The printing of the label, as hereinafter described, occurs at the time that the remainder of the information relating to the colour coded digits is fed in to the first shift register 270 and must be applied after the file folder has advanced the fourteen machine cycles to bring it past the final "9" digit colour coded labeller. There must therefore be a space of fourteen printed labels between the printer device and the point of application, that is, the print number for fourteen file folders must be printed before the first print number, i.e. 103, is applied, to the first file folder.

Print Control Unit

As explained, when the first three digits 1,0,3 of the number, e.g. number 103, 271, 035, are entered regardless of the mode of entry, they are immediately delivered either on the main bus 255 directly through the selector 400 in the case of the Keyboard or Card Reader Mode or through the first 3 counters 228, multiplex unit 230 and selector 400 in the case of the numeric sequential mode input to the No. 1, No. 2 and No. 3 Printer Register Latch and Gates 320, 323, and 325, respectively. The No. 1 Printer Register 320 is enabled by a strobe from the Master Clock 221 when the MXAC 220 is at step 1, that is, at MXAC1 (FIG. 20A). The Master Clock strobe signal is fed to the No. 1 Printer through AND gate 322. The No. 1 Printer accepts and stores the "1" digit data. Similarly, the No. 2 Printer Register Latch and Gate 323 is enabled at MXAC2 which then addresses AND gate 324 allowing the Master Clock strobe signal to press to the printer which on being enabled accepts and stores the data for the second digit "0." Similarly the third digit "3" is entered and stored in the No. 3 Printer Register Latch and Gate 325 at MXAC3 upon the Master Clock strobe being delivered thereto through AND gate 326.

The data stored in the No. 1, No. 2 and No. 3 Printer Register 320, 323 and 325 is required to be delivered to the printer in synchronism with the conveyor operation and only of course if a folder is being fed on the conveyor, as hereinafter more fully explained. However, a further complicating factor is the fact that the number represented by the first three digits has to be printed twice, as illustrated in FIG. 25, where the number 103 is depicted as appearing twice on the printed label Lp. This label $L_p$ is also shown as having printed thereon the number 103 printed at one end in OCR Code. Again, the number to be printed on the label $L_p$ may only contain two digits, e.g. the print number may only be ten rather than 103, as illustrated in FIG. 26B. It will be appreciated that if the 3 were simply removed from the label in FIG. 25, the duplication of 10 would be unbalanced relative to the label fold line f—f, whereas in FIG. 26 it will be seen that the 10 is balanced on each side of the label fold line f—f. Similarly, in FIG. 27, where the print number contains only one digit, e.g. 1, this digit is again balanced on each side of the fold line f—f. It will be apparent that if the 03 of the number as printed in the label in FIG. 25 were removed, the remaining one digit number 1 would be totally unbalanced relative to the fold line f—f. To accommodate the change from a one to a three digit print number and to maintain the desired label balance, the format of the printer must be controlled. With reference to FIG. 25, it will be seen that, reading from left to right, the digit "1" is printed at a first position and again at a fourth position, the digit "0" is printed at a second position and again at a fifth position and the digit "3" is printed at a third position and again at a sixth position. In the case of the two digit number shown in FIG. 26, the "1" is printed at the corresponding second position and also at the corresponding fourth position; the "0" is printed at the third position and at the corresponding fifth position. In the case of the one digit number "1" in FIG. 27, the "1" is printed at both the corresponding third and fourth positions. The change in the format of the duplicate printing of the "one," "two," and "three" digit numbers does not need to affect the printing of the OCR numbers on the edge of the label, since their location is immaterial for the OCR scanning.

To control the format of the printer 111, there is provided a data present decoder 328 (FIG. 20) which scans the data going down the main bus 255 and delivers a signal to control box 329 (FIG. 20A) called "NUMBER OF PRINTER REGISTERS WITH DATA OTHER THAN SPACE." this control box 329 in turn in response to the input information from the decoder 328, enables either the one digit format selector 330, the two digit format selector 331 or the three digit format selector 332. These format selectors 330, 331 and 332 are connected to output enable the printer registers 325, 323 and 320, respectively, in the appropriate format when the print signal is given, as hereinafter explained.

It will be understood, of course, that in the case of the number 103, to be printed, all three printer registers will have data stored therein at the conclusion of the MXAC3 step during the data entry procedure and the signal fed to the control box 329 will have indicated that there are three printer registers with data other than space contained therein and the three digit format selector 332 will be enabled. If the print number was only 10, the most significant digit would be missing and the number 10 constitutes the second and third most significant digits, so that there would be no data stored in the No. 1 printer register 320, the "1" data would be stored in the No. 2 printer register 323 and the "0" data would be stored in the No. 3 printer register 325. It would also have been recorded that the number of printer registers with data is two and that the two data format selector 331 would have been enabled. Should the print number be 1, the No. 1 and No. 2 printer registers 320 and 323 would contain no digit data and the No. 3 printer register 325 would contain the data representing 1 and the one digit format selector 330 would be enabled.

With the data present in the respective printer registers, and with the appropriate digit format selector enabled, and the data is ready to be outputted from the counters, the instructions to the printer 111 to print are given as follows: With the conveyor operating and the conveyor data transfer pulse and folder present signal having been given, there will, as previously explained, be an output signal from AND gate 251. This output signal is delivered to an AND gate 333 (shown on FIG. 20B and again in dotted line on FIG. 20A) which also receives the conveyor data transfer pulse. The result is an output signal through AND gate 333 delivered to the set section of a set/re-set device 334. This sets the device 334 to pass the signal on to AND gate 335 to which are also delivered the clocks from the Master Clock 221. The output signal from the AND gate 335 initiates counter 336 which clocks three counts to each clock of the Master Clock. On clock 1 of counter 336 a strobe signal is delivered to the printer 111 so that this strobe signal is isolated from the instructions being fed up to the digit format selectors 330, 331 and 332 through counter 337 on the third clocking of the counter 336. Counter 337 has output lines labelled in the counter 0, 1, 2, 3, 4, 5, 6, 7 and 8. The output lines 0 to 5 correspond to the six potential positions of the numbers to be printed, i.e. where the number to be printed is a three digit number, the six positions will be the first, second, third, fourth, fifth and sixth as shown in FIG. 25. On the clocking up of the first output clock counter 336, counter 337 will be shifted from the 0 to the 1 position.

On the next count of 3 by clock 336, counter 337 will be shifted from position 1 to position 2, etc. until counter 337 has reached its 5 position. If the three digit format control 332 is selected by control 329 because all three of the Printer Registers contained digit data, then output enabling signals to the No. 1 Printer Register 320 would have been given on lines 0 and 3 of counter 337. Signals would also have been given to the No. 2 Printer Register 323 on lines 1 and 4 and the No. 3 Printer 325 on lines 2 and 5. If, on the other hand, only No. 2 and No. 3 Printer Registers 323 and 325 contained digit data, then the two digit format control 331 would have been selected and no output enabling signal would be given to the No. 1 Printer Register, the No. 2 Printer Registers would be enabled on lines 1 and 4 and the No. 3 Printer Register would be enabled on lines 2 and 5. In the case of a print number containing a single digit, then the one digit format control 330 would be selected and no output enable signals would be fed to the No. 1 and No. 2 Printer Registers but output enable signals would be delivered to the No. 3 Printer Register 325 on lines 2 and 3. Whenever there is no enable signal delivered to one or more of the Printer Registers 320, 323, and 325, gate 338 which is hardwired into the system provides a "space" or no digit signal to the printer 111 so that the printer will not print any digit at that location. In each of the above described situations, the stage is set for the mode of printing of the printer 111, that is 1, 2, or 3 digit format, and on the next clocking of counter number 337, the counter will move from position 5 to position 6 which will enable gate 339 which is hardwired to deliver a signal to the printer 111 to print. The printer will then print the appropriate number in duplicate according to the format selected and where the OCR is also to be applied to the label this signal will also instruct the printer to print the corresponding OCR number. On the next clocking of counter 337, the counter will move from position 6 to position 7 which will output enable gate 340 which is also hardwired to provide a signal upon being enabled to instruct the printer that the printing is completed and the printer advances the printed label in preparation for printing the next succeeding label. On the next clocking from position 7 to 8 of counter 337, a signal is delivered to the re-set section of the set/re-set device 334 to re-set counters 336 to 337 pending receipt of the next print signal from AND gate 333.

When the print signal is fed to the set/re-set device 334 it is also delivered to an "OR" gate 343 to enable the printer labeller 110 to dispense a printed label (or a label which bears no print if it was not printed) when the printed labeller 110 receives its impulse to label on passage of its controlling code wheel finger 207 past proximity switch 208.

It will be understood that a print signal may be delivered through AND gate 333 but there may in fact be no data in any of the No. 1, 2, or 3 Printer Registers since there may be no printed label to be attached to the folder. In this case, gate 338 will have instructed the printer that a "space" is to occupy each print position and on the signal to print being given at the sixth clock of counter 337 there will be no number printed on the label which is advanced out of the printer on the next clock of counter 337 so that the previously printed labels can keep step with their respective folders.

On the other hand, information may be stored in one or more of the printer registers and the conveyor may be operating so that the conveyor data transfer pulse is delivered to AND gate 333 but, for example, a folder may not be present. In this case, AND gate 333 will not operate to give instructions to print, but AND gate 341 which is connected to the output of AND gate 251 through inverter 342 and to the conveyor data transfer pulse source 211 (shown in FIG. 20B and again in dotted line in FIG. 20A) will operate to deliver a signal to OR gate 343 to enable labeller 110 to label when instructed by its controlling code wheel so that the label printed 14 cycles earlier will be applied to the file folder with which it is to be associated.

In this situation gate 338 reacts to the no data code being passed on to shift register 270 to cause the printer to advance a label which bears no print so that the preceding printed labels can advance to keep step with the file folders to which they are to be applied.

As previously explained, since the printer 111 prints the first label for the first file folder at the time the file folder is deposited on the conveyor and its presence is indicated by the folder present detector, this printed label will not be brought to meet the first file until the first file has advanced to the point of printed label application fourteen machine cycles later. In the meantime, the printer will have printed the label for the next succeeding thirteen file folders so that a loop of fourteen printed labels is required between the printer and the point of printed label application, which takes place at the nose 158 of the delivery ramp 157 of labeller 110. When for example the unprinted label for which there was no file folder reaches the point of delivery it is in fact delivered off the nose 158 of the ramp 157 but not meeting a file folder, it passes through a slot 346 in the leg 12 of T bar 10 (see FIGS. 1 and 12).

While the operation of the printer control unit and the printer 327 has been described with respect to the printing of digits, it will be understood that the printers may also print labels with up to three letters printed in duplicate thereon. The letters can be introduced into the three printer registers 320, 323 and 325 either by the keyboard input 222 or the card reader 223 since this data is fed directly onto the main bus 255 which carries the full ASCII code. The data present decoder 328 will detect the presence of data in either 1, 2 or 3 of the printer registers and will choose the appropriate "one digit," "two digit," "three digit" format and these format selectors will be equally applicable to 1, 2 or 3 letters.

Also while the labellers have been described as containing labels of the digits "0" to "9," any one of the labels could be sub-divided into half labels so that, for example, depositing of an "0" label would in fact be depositing a label which has two zeros thereon, one adjacent the other, so that effectively the application of the one label would be equivalent to the application of two "0" labels, and so on.

Instead of digits, the labels deposited by the labellers could also be letters by simply converting the data representative of the digits into data representative of letters. For example, the first labeller might be set up to label labels bearing the letter "A" instead of the digit "0." The input data to the counters 228 would still be input as data representative of the digit "0" and would be decoded at the "0" labeller as instructions to label "0" but the label when deposited would constitute the letter "A." Similarly, the second labeller described as labelling the digit 1 could label the label "B," etc. In this way, ten letters could be applied to the file folders as they are fed through the machine. Since there are 26 letters, the machine could be set up again so that the zero digit labeller would now label the eleventh letter "K," the one digit labeller would label the twelfth letter "L," etc. and the next ten letters could be applied to the file folders at the appropriate position on a second pass of the folder through the machine. Any remaining letters could be applied to the folders in a third pass through the machine where the remaining six letters could be applied. With respect to applying, for example, names on file folders, as a practical matter, a number of the letters of the alphabet such as X and Z appear so infrequently that the commonest letters which would make up most of the names could be applied by two passes of the file folders through the machine and even in a very large group of files, the number of files whose names would not be complete would be extremely small, and the missing letters could be applied manually. Alternatively, of course, as a matter of principle, the capacity of the machine operating on the same principles as described could be increased and the machine set up with twenty six labellers, and the corresponding control unit for twenty six labellers could be delivered beneath the twenty six labellers so that any and every combination of letters could be applied to the file folders in one pass through the machine.

While the operation of the machine has been described with respect to the feed of file folders therethrough, strips 344 such as illustrated in FIG. 28, for subsequent attachment to file folders may be fed and labelled in the manner described with respect to the file folders.

Alternatively, it will be apparent that any suface which is caused to move at the conveyor speed beneath the labellers can have deposited on it during each machine cycle, that is, 12" of travel, a series of labels in the same manner as the labels are deposited on the file folders, as discussed in detail above. Thus it will be apparent that the machine is adaptable to applying the requisite labels for a filing system or the like to a continuous web 325 of suitable material such as illustrated in FIG. 29, fed beneath the labellers at the rate of 12" per machine cycle and this web 345 can subsequently be severed into sections bearing the label groupings and these resulting segments or strips can be attached to file folders or put to any other suitable use. It will be also apparent to the man skilled in the art that variations may be made to details of the various components utilized in the labelling apparatus specifically described without departing from the spirit of the invention or the scope of the appended claims.

What we claim is:

1. Apparatus for automatically applying to a carrier surface a plurality of indicia constituents arranged at predetermined positions and in predetermined order on such surface to prsent a predetermined indicia display according to a predetermined scheme, said apparatus comprising a plurality of indicia constituent sources each adapted upon actuation to apply its indicia constituent to a moving surface when prepared for actuation by input data, one source for each indicia constituent to be called for by said scheme, a transport system for transporting a carrier, to an area of the surface of which indicia is to be applied, in continuous uninterrupted movement past each of said indicia constituent sources in turn to progressively present thereto the entire carrier indicia receiving area for the application thereto of indicia from such source at any and all positions within said area upon actuation of such source, and a control unit responsive to input control data designating the desired indicia display and to the presence and feed of the carrier to which the indicia is to be applied connected to said indicia applying sources to prepare a selected one or ones thereof as called for by said input control data for actuation as the continuously moving carrier surface area is progressively presented thereto and means responsive to movement of said transport system to actuate the prepared selected one or ones of said indicia applying sources to apply the respective indicia constituent to the carrier surface at any or all of said positions as called for by said input control data.

2. Apparatus as claimed in claim 1 in which at least certain of said indicia constituent sources are adapted to apply colour coded indicia.

3. Apparatus for applying at predetermined positions within a predetermined location on a carrier surface predetermined discrete pieces of indicia which in combination provide a predetermined indicia presentation particular to said carrier surface location as part of a scheme of marking like surface locations with indicia presentations which may vary from location to location, said apparatus comprising a plurality of indicia applying sources consisting of a source for each discrete piece of indicia to be called for by said scheme, each said indicia applying sources being adapted upon actuation to apply its discrete piece of information to a moving surface when prepared for actuation, means for feeding said carrier in a continuous uninterrupted motion past each of said indicia applying sources so that each predetermined point within said predetermined location is presented for the application thereto of indicia from each said source, a control unit for preparing said indicia applying sources for actuation in response to input thereto of input control data for said predetermined surface location defining the discrete pieces of indicia and position thereof required therefor, and means responsive to movement of said feeding means for activating any of said sources which applies any discrete piece of indicia called for by the input control data respecting such locations as prepared by said control unit to apply such indicia at any and all positions called for by such input control data as the carrier surface is moving with uninterrupted motion thereby.

4. Apparatus as claimed in claim 3 in which at least some of said sources of discrete pieces of indicia are labellers adapted to dispense and apply preprinted labels to a moving surface.

5. Apparatus as claimed in claim 4 in which said sources of discrete pieces of indicia include ten labelling devices, each labelling device being adapted to dispense and apply a colour coded label bearing one of the digits "0" to "9" with each labeller dispensing a different digit.

6. Apparatus as claimed in claim 3 in which said indicia applying sources include a printing device.

7. Apparatus as claimed in claim 3 in which said indicia applying sources apply indicia which is both visually and machine readable.

8. Apparatus for applying at predetermined positions within a predetermined location on a carrier surface predetermined discrete pieces of colour coded indicia which in combination provide a predetermined colour coded indicia presentation particular to said carrier surface location as part of a scheme of marking like surface locations with colour coded indicia presentations which may vary from location to location, said apparatus comprising a plurality of colour coded indicia applying sources consisting of a source for each discrete piece of colour coded indicia to be called for by said scheme, each said sources being adapted to apply its discrete piece of colour coded indicia to a moving surface, means for feeding said carrier surface in a continuous uninterrupted motion past each of said indicia applying sources so that each predetermined position within said predetermined location is progressively presented for the application thereto of colour coded indicia from each said source, and a control unit for preparing said indicia applying sources for actuation in response to input thereto of input control data for said predetermined surface location defining the discrete pieces of colour coded indicia and position thereof required therefor, and means responsive to the movement of said feed means for activating any of said sources which has been prepared by said control means for application of its indicia to any predetermined position or positions within said predetermined location as such position or positions is presented thereto.

9. Apparatus as claimed in claim 8 in which at least some of said sources of discrete pieces of indicia are labellers which dispense and apply preprinted colour coded labels.

10. Apparatus as claimed in claim 9 in which said sources of discrete pieces of indicia comprise ten labelling devices, each labelling device being adapted to dispense and apply a colour coded label bearing one of the digits "0" to "9" with each labeller dispensing a different digit.

11. Apparatus as claimed in claim 8 in which said apparatus further includes a printing device under control of said control unit for printing indicia according to said input control data, and means to apply said printed indicia to a moving surface said latter applying means being actuated by said means responsive to the movement of said feed means to apply said printed indicia.

12. Apparatus as claimed in claim 8 in which said indicia applying sources apply indicia which is both visually and machine readable.

13. An automatic labelling machine comprising a conveyor to feed at a constant velocity therealong a carrier, an area of whose surface is to be labelled with a predetermined plurality of colour coded labels selected from a predetermined group of colour coded indicia bearing labels with the selected labels to be applied at predetermined positions within said surface area according to a predetermined scheme, a plurality of labellers adapted when prepared for labelling to apply labels to a moving surface, one labeller for each colour coded label to be called for by said scheme mounted relative to said conveyor whereby said surface of the carrier being fed therealong is progressively presented in turn to each of said labellers in position to have a label applied thereto at any and all of said predetermined positions within said area by each of said labellers when same is activated, a control unit for preparing said labellers for actuation in response to input thereto of input control data for said surface area defining the labels and the position thereof required therefor, and signal generating means responsive to conveyor movement for actuating said prepared labellers to label as the position at which the respective label is to be applied according to said scheme is presented thereto.

14. An automatic labelling machine as claimed in claim 13 in which said colour coded indicia bearing labels bear machine readable indicia.

15. An automatic labelling machine as claimed in claim 13 further including at least one labeller under actuation control of said signal generating means to apply to said carrier surface a label which is printed in response to said input control data prior to being applied.

16. An automatic labelling machine as claimed in claim 15 in which said printing on the label which is printed in response to said input control data includes machine readable indicia.

17. An automatic labeller as claimed in claim 13 in which said plurality of labellers comprises at least ten labellers, one each for dispensing colour coded labels bearing one of the ten digits "0" to "9" respectively.

18. An automatic labeller as claimed in claim 17 in which each of said colour coded labels bearing digits "0" to "9" also bear machine readable indicia corresponding respectively to said digits "0" to "9."

19. An automatic labelling machine as claimed in claim 15 in which said labeller which applies a label which is printed in response to said input control data prior to being applied, applies a label having a number having from one to three digits printed thereon.

20. An automatic labelling machine as claimed in claim 19 in which the label which is printed with said number is also printed with machine readable indicia corresponding to said number.

21. An automatic labelling machine comprising a conveyor to successively feed therealong with continuous uninterrupted motion a plurality of items to be individually labelled with a predetermined plurality of labels selected from a group of labels with the selected labels to be applied at predetermined positions on a surface of the item in accordance with a predetermined labelling scheme, a plurality of labelling devices adapted to apply labels to a continuously moving surface, one of each label included in said group of labels, mounted relative to said conveyor whereby an item being fed therealong passes successively past said labelling devices, and presents successively to each of said labelling devices all positions of the surface thereof on which a label dispensed from such labeller may require to be applied, and means responsive jointly to input control data and conveyor movement for selectively controlling said labelling devices to activate same to apply the appropriate labels at the appropriate positions on the surfaces of said items in accordance with said predetermined labelling scheme.

22. A labelling machine comprising at least one labeller adapted to label a moving surface, means associated with said labeller and responsive to input data to prepare said labeller for actuation upon data input, means for feeding a surface to be labelled past said at least one labeller with continuous uninterrupted movement in appropriate label receiving relation thereto, a control unit for supplying input data to said means associated with said labeller to prepare said at least one labeller for labelling in accordance with a predetermined labelling scheme, signal generating means responsive to said feed means for actuating said at least one labeller when same is prepared for labelling by said control unit to effect delivery of a label thereby on to said surface when same is in appropriate label receiving relation thereto.

23. A labelling machine as claimed in claim 22 in which said feed means feeds the surface to be labelled in a manner to progressively bring each of a plurality of label receiving positions on said surface into appropriate label receiving relation to said at least one labeller and said signal generating means is made responsive to said feed means to actuate said labeller to apply a label at at least one selected position of said label receiving positions when said labeller is prepared for labelling by said control means.

24. A labelling machine as claimed in claim 23 in which said control unit is responsive to input data and prepares said at least one labeller for labelling in accordance with said input data.

25. A labelling machine as claimed in claim 24 in which said at least one labeller has printing means associated therewith for printing labels to be applied by said labeller and said control unit is responsive to input data to control said print means to print the labels in accordance with said input data prior to their application by said at least one labeller.

26. A labelling machine as claimed in claim 24 in which said feed means feeds said surface to be labelled into position to have labels applied by said at least one labeller at any of said receiving positions project a significant portion of their length beyond the edge of said surface, and means for folding over said significant label portion about a line of fold along the edge of said surface to effect adherence of same to the opposite side of said surface.

27. A labelling machine as claimed in claim 26 the label portion applied to said surface and the folded over label portion adhered to the opposite side of said surface bear corresponding indicia.

28. A label machine as claimed in claim 29 in which at least one of said label portions bears machine readable indicia.

29. A labelling machine as claimed in claim 26 in which said at least one labeller has printing means associated therewith for printing labels to be applied by said labeller and said control unit is responsive to input data to control said print means to print the labels in accordance with said input data prior to their application by said at least one labeller.

30. A labelling machine as claimed in claim 29 in which said control unit controls said print means to print corresponding indicia on the label portion applied to said surface and the label portion adhered to opposite side of said surface.

31. A labelling machine comprising a transport mechanism for carrying a planar member past a plurality of labelling stations with continuous uninterrupted motion, said planar member having a surface area presenting a plurality of label receiving positions which are to be labelled in accordance with a predetermined labelling scheme, a labelling device adapted to apply labels to a moving surface when prepared by input data for labelling located at each of said stations, the arrangement being such that each of said label receiving positions of said planar member is presented in turn to each of said labelling devices at each of said stations in position to have a label applied thereto by the respective labelling device upon same being actuated, a control unit responsive to input data comprising said predetermined labelling scheme for supplying data to such of said labelling devices which are to apply labels to one or more of said label receiving positions as called for by said predetermined labelling scheme to prepare said labellers for labelling, and signal generating means responsive to the operation of said transport mechanism for actuating each of said labelling devices which has been prepared for labelling by said control means to label at each label receiving position presented thereto for which such labelling device has been prepared for labelling by said control unit.

32. A labelling machine as claimed in claim 32 in which there are at least ten labelling stations each having a labelling device, each said labelling device being arranged to apply when actuated a different one of ten colour coded labels bearing the digits "0" to "9" respectively.

33. A labelling machine as claimed in claim 31 in which a printer device is associated with one of said labelling devices for printing indicia on labels to be applied by said one labelling device, said control unit being responsive to input data determining the indicia to be printed on the labels to be applied by said one labelling device and controlling said printer to print such indicia on such labels.

34. A labelling machine as claimed in claim 32 in which there is provided a further labelling station having thereat a further labelling device for applying a printed label, and a printer device associated with said further labelling device for printing indicia on labels to be applied thereby, said control unit being responsive to input data determining the indicia to be printed on said printed labels and controlling said printer to print such indicia on such labels, said further labelling device being adapted to apply the printed label to a moving surface when prepared for label applying by data from said control unit, said further labelling device being actuated to label when prepared for labelling by said signal generating means to apply a printed label to the position on the surface of the planar member as called for by said predetermined labelling scheme.

35. A labelling machine as claimed in claim 31 in which the labels applied by said labelling devices bear machine readable indicia, and means for reading said machine readable indicia to compare the indicia of the labels applied with the data fed into said control unit.

36. A labelling machine as claimed in claim 31 in which said control unit comprises a logic controller for receiving and storing the data comprising said predetermined labelling scheme said logic controller advancing said data from station to station in response to operation of said transport mechanism in advance of said planar member to prepare the labelling device at each of such stations for labelling at each of said label receiving positions on said planar surface called for by said input data.

37. A labelling machine as claimed in claim 36 in which said control unit has a data input selected from one of a key board mode, a card reader mode and a sequential mode.

38. A labelling machine comprising a conveyor for feeding file folders or like planar members with continuous uninterrupted feed past a plurality of labelling stations with the said planar members having a surface area lying along one edge portion which projects to and is conveyed along one edge of the conveyor and presents an area for receiving a plurality of labels at predetermined label receiving positions which are to be labelled in accordance with a predetermined labelling scheme, a magazine for storing the planar members to be labelled, means for feeding the planar members from said magazine to said conveyor, a labelling device located at each of said stations, each of said labelling devices being adapted when actuated to apply a label to a moving surface when prepared for actuation by input data, the arrangement being such that each of said label receiving positions of said surface area of each of the planar members is presented in turn to each of said labelling devices at each of said stations during travel of said conveyor to have an adhesive carrying label applied therto by the respective labelling device upon same being actuated with such applied label being disposed so that a significant portion thereof projects as a self supporting cantilever beyond said planar member edge portion and said one conveyor edge which said edge portion constitutes a fold line for such label, such label bearing corresponding indicia on opposite sides of said fold line, a control unit responsive to input data comprising said predetermined labelling scheme for preparing each of said labelling devices for applying a label at each of said label receiving positions if called for by said predetermined labelling scheme, signal generating means responsive to the operation of said conveyor for actuating each of said labelling devices to label at each label receiving position presented thereto for which such labelling device has been prepared for labelling by said control unit, and means for folding over said projecting cantilever label portions and effecting their adherence to the surface of the planar member opposite to the surface on which such labels have been applied by said labelling devices.

39. A labelling machine as claimed in claim 38 in which said stations are uniformily spaced in alignment along said conveyor mechanism and said conveyor mechanism continuously feeds said planar member in straight line motion past said stations at a constant speed.

40. A labelling machine as claimed in claim 38 in which there are at least ten labelling stations each having a labelling device, each said labelling device being arranged to apply when actuated a different one of ten colour coded labels bearing the digits "0" to "9" respectively repeated on opposite sides of the fold lines for such labels.

41. A labelling machine as claimed in claim 40 in which there is provided a further labelling station and a further labelling device for applying a printed label in response to data from said control unit and said signal generating means, and a printer device associated with said further labelling device for printing indicia on labels to be applied thereby, said control unit being responsive to input data determining the indicia to be printed to print such indicia on such labels.

42. A labelling machine as claimed in claim 38 in which the labels applied by said labelling devices bear machine readable indicia, and means for reading said machine readable indicia of the labels applied by said labelling devices to compare the indicia applied with the data fed into said control unit.

43. A labelling machine as claimed in claim 38 in which said control unit comprises a logic controller for receiving and storing the data comprising said predetermined labelling scheme, said logic controller advancing said data from station to station in response to conveyor operation in advance of said planar members to prepare the labelling device at each of such stations for labelling at each of said label receiving positions on said planar member called for by said input data.

44. A labelling machine as claimed in claim 43 in which said control circuit includes means responsive to the depositing of a planar member in said conveyor to initiate the advance of data respecting the labelling of such planar member from station to station to prepare the respective labelling devices for labelling as called for by said data.

45. A labelling machine as claimed in claim 43 in which one of said labelling devices has a printer device associated therewith for printing indicia on labels to be applied by said one labelling device and said logic controller includes means responsive to input data determining the indicia to be printed on the labels to be applied by said one labelling device controlling said printer to print such indicia on such labels.

46. A labelling machine as claimed in claim 45 in which said printer is controlled to print such indicia on both sides of the fold lines of such labels.

47. A labelling machine as claimed in claim 46 in which said logic controller includes means to control the format of printing of such indicia so that it is printed in balanced relation on both sides of the fold lines of such labels.

48. A labelling machine as claimed in claim 47 in which said logic control has a data input selected from one of a key board mode, a card reader mode, and a sequential mode.

49. A labelling machine as claimed in claim 38 in which said signal generating means is adjustable to control and determine said predetermined label receiving positions on said planar members.

50. A machine for applying a plurality of labels selected from one or more of a plurality of labelling devices each constituting a source of a different label to each of a plurality of predetermined surface areas of carrier means with the labels selected and applied at predetermined positions within each said area according to a predetermined scheme; said machine comprising means to feed said carrier means along a path with the predetermined label receiving surface areas thereof in predetermined uniformly spaced relation, a plurality of labelling devices, one for each different label called for by said scheme mounted along said path in predetermined uniformly spaced relation corresponding to the spacing between said label receiving areas of the carrier means fed along said path, the arrangement being such that on carrier means feed corresponding label receiving positions of different label receiving surface areas are simultaneously presented for labelling to each of said labelling devices, and means for simultaneously actuating such of those labelling devices whose label is called for at the label receiving position of the carrier surface area presented thereto called for by said scheme to apply a label to such position.

51. A machine as claimed in claim 50 in which said feed means feeds said carrier means along said path with continuous uninterrupted movement.

52. A machine as claimed in claim 51 in which said means for simultaneously actuating said labelling devices comprises a control unit responsive to input data comprising said labelling scheme to prepare said labelling devices for the labelling of the positions of the surface area presented thereto as called for by said scheme, and signal generating means responsive to movement of said feed means for actuating such of said labelling devices to label as have been prepared by said control unit as the positions of the surface area to be labelled according to said scheme are presented thereto.

53. A machine as claimed in claim 52 to which said control unit is responsive to feed of said carrier means in its preparation of said labelling devices for labelling.

54. A machine as claimed in claim 50 in which at least some of said labelling devices are adapted to apply colour coded labels.

55. A machine as claimed in claim 53 in which each of said labelling devices has a control system associated therewith connected to said control unit and said signal generating means, the connection to said control unit providing signal means corresponding to the input data with respect to label requirement of the position of the surface area about to be presented thereto, and the connection to the signal generating means providing the instructing signal to label as such latter surface area position is presented thereto for labelling if a label is required at such position as determined by said control unit.

56. A machine as claimed in claim 55 in which said labelling devices are adapted to apply their labels to said surface position with the labels moving in the same direction and at substantially the same speed as said carrier means.

57. A machine for applying a plurality of labelling devices selected from one or more of a plurality of labelling devices each constituting a source of a different label to file folders or the like with the labels selected and applied at predetermined label receiving positions on the file folders according to a predetermined scheme, said machine comprising a conveyor adapted to feed file folders or the like along a path with the folders in predetermined uniformly spaced relation, a plurality of labelling devices, one for each different label called for by said scheme mounted along said path in predetermined uniformly spaced relation corresponding to the spacing of said file folders, the arrangement being such that on folder feed corresponding label receiving positions of different file folders are simultaneously presented for labelling to each of said labelling devices, and means for simultaneously actuating such of those labelling devices whose label is called for at the label receiving position of the folder presented thereto by said scheme to apply a label to such position.

58. A machine as claimed in claim 57 in which said conveyors feed said file folders in a continuous uninterrupted feed along said path.

59. A machine as claimed in claim 58 in which said means for simultaneously actuating said labelling devices comprises a control unit responsive to input data comprising said labelling scheme to prepare said labelling devices for the application of the labels to the file folders at the label receiving positions required by said scheme as said positions are presented thereto, and signal generating means responsive to conveyor feed for actuating such of said labelling devices to label as have been prepared by said control unit as the positions of the file folder to be labelled according to said scheme are presented thereto.

60. A machine as claimed in claim 59 in which means are provided to feed file folders or the like to said conveyor for feed therealong and said control unit is responsive to the presence and feed of file folders along said conveyor in its preparation of said labelling devices for labelling.

61. A machine as claimed in claim 60 in which at least some of said labelling devices are adapted to apply colour coded labels.

62. A machine as claimed in claim 59 in which each of said labelling devices has a control system associated therewith connected to said control unit and said signal generating means; the connection to said control unit providing signal means corresponding to the input data with respect to label requirement at the positions of the folder about to be presented thereto and the connection to the signal generating means providing the instructing signal to label as such latter folder position is presented thereto for labelling if a label is required at such position as determined by said control unit.

63. A machine as claimed in claim 62 in which said labelling devices are adapted to apply their labels to said folder positions with the labels moving in the same direction and at the same surface speed as said folders.

* * * * *